(12) United States Patent
Ishitobi

(10) Patent No.: US 7,488,031 B2
(45) Date of Patent: Feb. 10, 2009

(54) AUTOMOTIVE ENGINE HOOD

(75) Inventor: Hideki Ishitobi, Shinagawa-ku (JP)

(73) Assignee: Kobe Steel, Ltd., Kobe-shi (JP)

( * ) Notice: Subject to any disclaimer, the term of this patent is extended or adjusted under 35 U.S.C. 154(b) by 14 days.

(21) Appl. No.: 11/758,330

(22) Filed: Jun. 5, 2007

(65) Prior Publication Data

US 2008/0007094 A1    Jan. 10, 2008

(30) Foreign Application Priority Data

Jul. 7, 2006  (JP)  ............................ 2006-188483
Jul. 27, 2006  (JP)  ............................ 2006-205181

(51) Int. Cl.
   *B62D 25/10* (2006.01)
(52) U.S. Cl. ............................ 296/193.11; 296/187.04
(58) Field of Classification Search ............ 296/193.11, 296/187.04; 180/69.2, 26.21, 69.21
   See application file for complete search history.

(56) References Cited

U.S. PATENT DOCUMENTS

| | | | | |
|---|---|---|---|---|
| 5,000,997 | A * | 3/1991 | Ritchie et al. | .................. 428/78 |
| 5,115,878 | A * | 5/1992 | Hayata | ..................... 180/69.21 |
| 7,140,673 | B2 * | 11/2006 | Ito et al. | ................. 296/193.11 |
| 7,150,496 | B2 | 12/2006 | Fujimoto | |

FOREIGN PATENT DOCUMENTS

| | | |
|---|---|---|
| EP | 1 357 018 A1 | 10/2003 |
| EP | 1 516 803 A2 | 3/2005 |
| FR | 2 875 777 | 3/2006 |
| JP | 3674918 | 5/2005 |
| WO | WO 00/35612 | 6/2000 |

* cited by examiner

*Primary Examiner*—Dennis H Pedder
(74) *Attorney, Agent, or Firm*—Oblon, Spivak, McClelland, Maier & Neustadt, P.C.

(57) ABSTRACT

An automotive engine hood is built by joining together respective edge parts of an outer panel and an inner panel such that spaces are formed between the outer and the inner panel. The inner panel has a plurality of ridge-like beads and ridge-like connecting beads connecting at least end parts of the beads on one of the opposite sides of the beads with respect to length of the beads. Each of the connecting beads has a top wall having a connecting surface continuous with the joint surfaces of the top walls of the beads, and a first inclined surface extending from the connecting surface to a bottom surface surrounded by the adjacent ones of the beads and the connecting beads. The automotive engine hood meets in equalities: 1.5 h<L and L<D, where L is distance between a boundary between the connecting surface and the first inclined surface, and a boundary between the first inclined surface and the bottom surface along the surface of the inner panel, h is height of the connecting surface from the bottom surface, and D is distance between one of the opposite ends of the bottom surface and a middle part of the bottom surface.

10 Claims, 15 Drawing Sheets

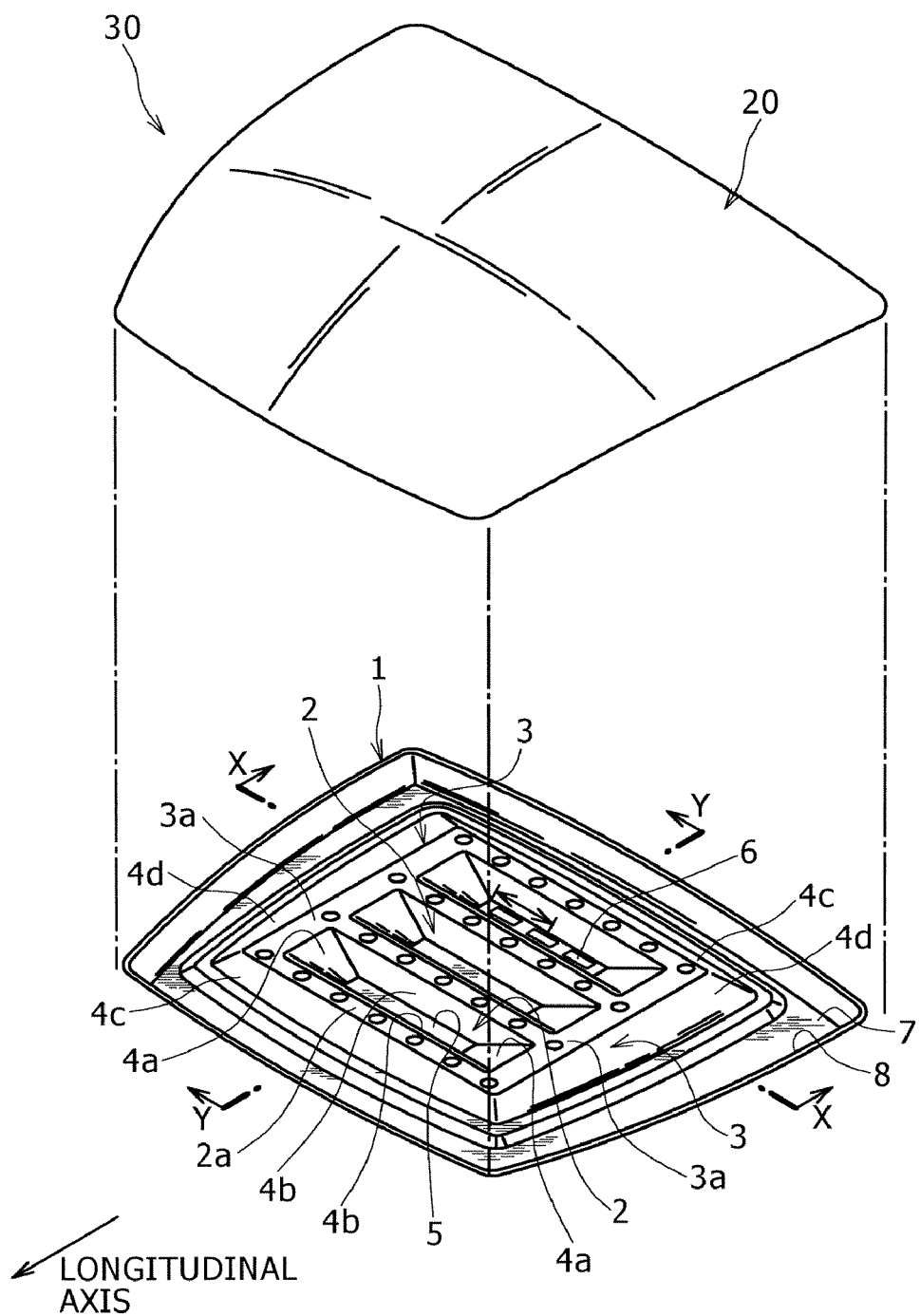

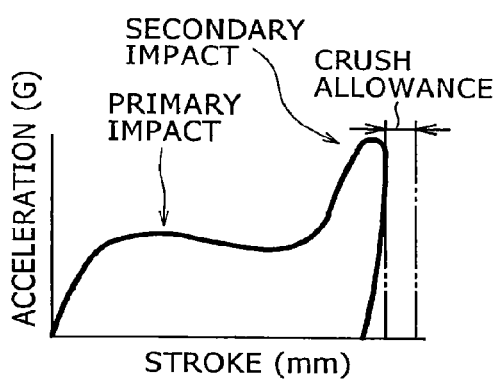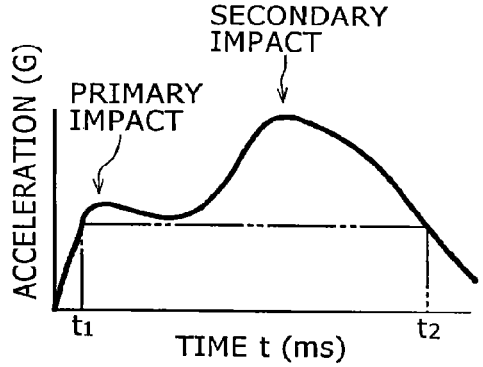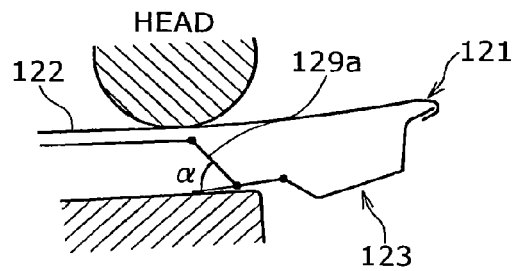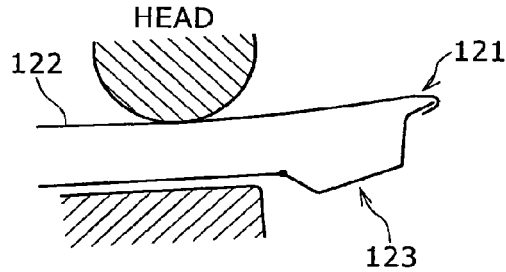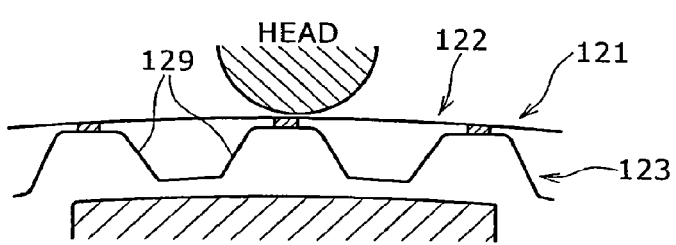

AUTOMOTIVE ENGINE HOOD

BACKGROUND OF THE INVENTION

1. Field of the Invention

The present invention relates to an automotive engine hood formed by joining together an outer panel and an inner panel and, more particularly, to an automotive engine hood capable of effectively absorbing energy imposed thereon by collision.

2. Description of the Related Art

Pedestrian protecting means have been prescribed by law in recent years to protect pedestrians from automobile accidents. Pedestrian protecting ability of automotive engine hoods is a noticeable index of rating automotive engine hoods. The size of automotive engines has been increased with the progressively increasing the output power of automotive engines. Multiplication of functions of automotive engines requires a large engine room due to increased parts and structural members to be installed in an engine room. Consequently, a pedestrian-protective space underlying the engine hood has been reduced. Thus the development of automotive engine hood capable of effectively absorbing energy imposed thereon by collision even if only a small space is formed under the automotive engine hood is indispensable to cope with both requirements of sporty car design and requirements of pedestrian-protective performance.

An automotive engine hood proposed in Jpn. Pat. No. 3674918 meeting those requirements is a hollow structure formed by joining together an outer panel and an inner panel so as to form a space between the outer and the inner panel. Another previously proposed automotive engine hood includes an outer panel, and an inner panel provided with dimples of different depths to form a space between the outer and the inner panel.

FIGS. 14A, 14B, 14C, 15A, 15B, 15C, 15D, 15E, 16A, 16B and 16C show a known automotive engine hood. FIG. 14A is a perspective view of the known automotive engine hood, FIG. 14B is a sectional view taken on the line Y-Y in FIG. 14A, FIG. 14C is a sectional view taken on the line X-X in FIG. 14A, FIG. 15A is a graph showing the relation between acceleration and stroke at a part a of the automotive engine hood shown in FIG. 14A at the impact of the pedestrian's head on the automotive engine hood, FIG. 15B is a graph showing the variation of acceleration of the part a of the automotive engine hood shown in FIG. 14A with time at the impact of the pedestrian's head on the automotive engine hood, FIG. 15C is a sectional view taken on the line $XI_d$ in FIG. 14A, FIG. 15D is a sectional view taken on the line $XI_c$ in FIG. 14A, FIG. 15E is a sectional view taken on the line $XI_e$ in FIG. 14A, FIG. 16A is a typical view typically illustrating the known automotive engine hood at the impact of the pedestrian's head on the automotive engine hood, FIG. 16B is a graph of assistance in explaining the relation between acceleration of a central part of the automotive engine hood at the impact of the pedestrian's head on the automotive engine hood and time, and FIG. 16C is a graph showing the relation between acceleration and stroke at the central part of the automotive engine hood shown in FIG. 16B at the impact of the pedestrian's head on the automotive engine hood.

Referring to FIGS. 14A to 14C, an automotive engine hood 121, which is a corrugated automotive engine hood, includes an outer panel 122 curved in predetermined curvatures, and a corrugated inner panel 123 having a depressed edge part 125 and a plurality of ridge-like beads 129 extending perpendicularly to the longitudinal axis of the vehicle. The automotive engine hood 121 is formed by joining the depressed edge part 125 of the inner panel 123 to the edge of the outer panel 122 by hemming. As shown in FIG. 14B, spaces 124 are defined by the outer panel 122, and the depressed edge part 125 and parts between the adjacent ridge-like beads 129 of the inner panel 123. Top walls of the ridge-like beads 129 are bonded to the inner surface of the outer panel 122 by bonding parts 127.

The pedestrian-protective performance of the automotive engine hood is evaluated by head injury criteria (hereinafter abbreviated to "HIC") expressed by Expression (1).

$$HIC = (t2-t1)\left[1/(t2-t1)\int_{t1}^{t2} a dt\right]_{max}^{2.5} \quad (1)$$

where a is three-axis composite acceleration in G of the center of gravity of the head, t1 and t2 are times when the value of HIC reaches a maximum, 0<t1<t2, and (t2−t1)=15 ms.

As shown in FIGS. 16B and 16C, accelerations of the pedestrian's head at the impact of the pedestrian's head on the automotive engine hood 121 are classified roughly into a primary impact acceleration caused by the impact of the head on the automotive engine hood 121 and a secondary impact acceleration caused by the collision of the automotive engine hood 121 with vehicle components including an engine installed in the engine room. The relation between the respective magnitudes of the primary impact acceleration and the secondary impact acceleration is dependent on the construction of the inner panel; that is, cone type automotive engine hoods and beam type automotive engine hoods, which differ from each other in the construction of their inner panels, differ from each other in the relation between the respective magnitudes of the primary impact acceleration and the secondary impact acceleration. Typically, the relation between the acceleration a and time t and the relation between the acceleration a and stroke S are represented by curves shown in FIGS. 16B and 16C, respectively.

On the other hand, the automotive engine hood needs to have requisite basic properties including tensile rigidity, dent resistance, bending rigidity and torsional rigidity. Tensile rigidity is necessary to suppress elastic deformation when a force is exerted on the automotive engine hood to wax the automotive engine hood or when the automotive engine hood is pressed to close the automotive engine hood. The tensile rigidity is dependent on the thickness and the Young's modulus of the outer panel and the positions of the joints between the outer and the inner panel, namely, the positions of the bonding parts 127. Dent resistance is necessary to suppress formation of dents resulting from plastic deformation caused by flying gravels and the like. The dent resistance of the automotive engine hood is dependent on the proof stress and the thickness of the outer panel. Bending rigidity is necessary to suppress the elastic deformation of the edge part of the automotive engine hood resulting from the application of a pulling force to lock the automotive engine hood and the exertion of the reactive forces of rubber cushions, the damper stay and rubber seals on the automotive engine hood. Bending rigidity is dependent on the young's moduli and the shapes of the edge part of the inner panel forming the edge part of the automotive engine hood and reinforcing members, namely, the geometrical moments of inertia of those parts and members. Torsional rigidity is dependent on the bending rigidity of the edge part of the automotive engine hood and the thickness of a central part of the inner panel.

The automotive engine hood is required to have those requisite basic properties and to exercise the pedestrian-protective performance. A limited space extends under the automotive engine hood and over the engine and parts installed in the engine room. Therefore, most automotive engine hoods made of materials and having thicknesses and shapes designed so as to have those basic properties do not exercise the requisite pedestrian-protective performance.

When the head impacts on the known automotive engine hood 121 covering a small space as shown in FIG. 14A, the magnitude and the duration of the secondary impact acceleration at secondary impact is greater than those of the primary impact acceleration at the primary impact as shown in FIGS. 16B and 16C. Therefore, the secondary impact acceleration affects adversely to the HIC expressed by Expression (1) and the level of HIC is not satisfactory. Edge part 125 of the automotive engine hood 121 is required to have a high bending rigidity and hence, end parts of the ridge-like beads 129 of the corrugated inner panel 123 in the edge part 125 of the automotive engine hood 121 need to have a large geometrical moment of inertia and a high tensile rigidity. Therefore, as shown in FIGS. 15C, 15D and 15E, parts of the automotive engine hood 121 corresponding to the end parts of the ridge-like beads 129 are hard to crush and deform. Consequently, the secondary impact acceleration is high as shown in FIGS. 15A and 15B and the pedestrian-protective performance of the automotive engine hood 121 is poor.

One of method of solving those problems in the automotive engine hood is to maintain or increase the amount of energy absorbed at the primary impact, and to reduce the acceleration at the secondary impact by reducing crushing load capable of crushing the automotive engine hood. Such a method can be achieved by forming the inclined end walls 129a of the ridge-like beads 129 in an easily deformable shape or by reducing the inclination α (FIG. 14C) of the inclined end walls 129a of the ridge-like beads 129. If the inclination α of the inclined end walls 129a of the ridge-like beads 129 is reduced simply, the distance between the edge of the outer panel and each of the bonding part 127 at the opposite ends of the row of the bonding parts 127 increases. Consequently, the automotive engine hood cannot have sufficient tensile rigidity and the elastic deformation of the outer panel 122 increases.

SUMMARY OF THE INVENTION

The present invention has been made in view of those problems and it is therefore an object of the present invention to provide an automotive engine hood having a central part and an edge part having the requisite basic properties and excellent in pedestrian-protective performance.

One aspect of the present invention resides in an automotive engine hood including: an outer panel; and an inner panel; wherein respective edge parts of the outer and the inner panel are joined together such that spaces are formed between the outer and the inner panel; the inner panel has a plurality of ridge-like beads and ridge-like connecting beads connecting at least end parts of the beads on one of the opposite sides of the beads with respect to length of the beads; each of the beads has a top wall having a joint surface joined to the outer panel; each of the connecting beads has a top wall having a connecting surface continuous with the joint surfaces of the top walls of the beads, and a first inclined surface extending from the connecting surface to a bottom surface surrounded by the adjacent ones of the beads and the connecting beads, each of the beads has second inclined surfaces adjacent to the first inclined surfaces and extending from opposite side edges of the connecting surface to the bottom surfaces on the opposite sides thereof, an upward concave framing part formed in a framing part of the inner panel surrounding the beads and the connecting bead; the spaces extend between the outer and the inner panel in parts corresponding to the upward concave framing part, and in parts corresponding to the bottom surfaces; and distance L between a boundary between the connecting surface and the first inclined surface and a boundary between the first inclined surface and the bottom surface along the surface of the inner panel, and height h of the connecting surface from the bottom surface satisfy an inequality: 1.5h<L.

In the automotive engine hood according to the aspect of the present invention, the opposite ends of the transverse beads of the inner panel can be disposed at the same positions with respect to the edge part of the outer or the inner panel as those of the known automotive engine hood. Since the adjacent ones of the transverse beads are connected by the connecting beads, the continuous line is deformed in a curve, the automotive engine hood can be crushed by a small crushing load and the stroke of the pedestrian's head is long when the pedestrian's head impacts on the automotive engine hood and, consequently, the secondary impact acceleration is low.

In the automotive engine hood according to the aspect of the present invention, the beads are ridge-like transverse beads perpendicular to the longitudinal axis of the vehicle, and the ridge-like connecting beads interconnects the respective opposite ends of the adjacent ones of the transverse beads.

In the automotive engine hood according to the aspect of the present invention, the ridge-like beads maybe longitudinal beads substantially parallel to the longitudinal axis of the vehicle.

In the automotive engine hood according to the aspect of the present invention, the connecting surfaces may be continuous with the joint surfaces of the top walls of the beads.

In the automotive engine hood according to the aspect of the present invention, the connecting surfaces may be continuous with the joint surfaces and may be contained in a plane extending below a plane containing the joint surfaces of the beads. When the connecting surfaces are thus formed, the first inclined walls of the beads can be inclined at a smaller inclination without spacing the mastic points at the opposite ends of the beads, namely, joints of the opposite ends of the beads and the outer panel, a long distance apart from the edge of the inner panel.

In the automotive engine hood according to the aspect of the present invention, it is preferable that the distance L satisfies inequalities: 1.5 h<L and L<D, where D is the distance between one of the opposite ends of the bottom surface and a central part of the bottom surface.

Thus the inclined walls having the first inclined surfaces of the automotive engine hood are strong, the automotive engine hood can be crushed by a small crushing load and the stroke of the pedestrian's head impacted on the automotive engine hood is long. Consequently, the second impact acceleration can be reduced.

In the automotive engine hood according to the aspect of the present invention, at least a part of each of the inclined walls having the first inclined surfaces may be cut to form an opening.

The strength of the first inclined surface can be adjusted by the opening to reduce the hood crushing load and to increase the stroke. Consequently, the secondary impact acceleration can be reduced.

In the automotive engine hood according to the aspect of the present invention, trim holes may be formed in each of the bottom walls having the joint surfaces of the beads at predetermined intervals along the length of the bead.

When the bottom walls having the joint surfaces of the beads are provided with the trim holes, the absorbed amount of energy of the primary impact increases and the secondary impact acceleration can be reduced.

In the automotive engine hood according to the aspect of the present invention, the first inclined surfaces extending from the connecting surfaces of the connecting beads continuous with the joint surfaces of the transverse or the longitudinal beads to the bottom surfaces can be formed in gently sloping surfaces. Thus the automotive engine hood has requisite basic properties including tensile rigidity, dent resistance, bending rigidity and torsional rigidity, the values of HIC at the central part and the edge part of the automotive engine hood are small, and the automotive engine hood of the present invention is excellent in pedestrian-protective performance.

BRIEF DESCRIPTION OF THE DRAWINGS

The above and other objects, features and advantages of the present invention will become more apparent from the following description taken in connection with the accompanying drawings, in which:

FIG. 1 is an exploded perspective view of an automotive engine hood in a first embodiment according to the present invention;

FIG. 15A is a graph showing the relation between acceleration and stroke at the impact of the head on a part a of the automotive engine hood shown in FIG. 14A;

FIG. 15B is a graph showing the relation between acceleration and time at the impact of the head on the part a of the automotive engine hood shown in FIG. 14A;

FIG. 15C is a typical end view of a part XIc in FIG. 14A;

FIG. 15D is a typical view of a part XId in FIG. 14A;

FIG. 15E is a typical view of a part XIe in FIG. 14A;

DESCRIPTION OF THE PREFERRED EMBODIMENTS

Preferred embodiments of the present invention will be described with reference to the accompanying drawings.

Figure 2A:
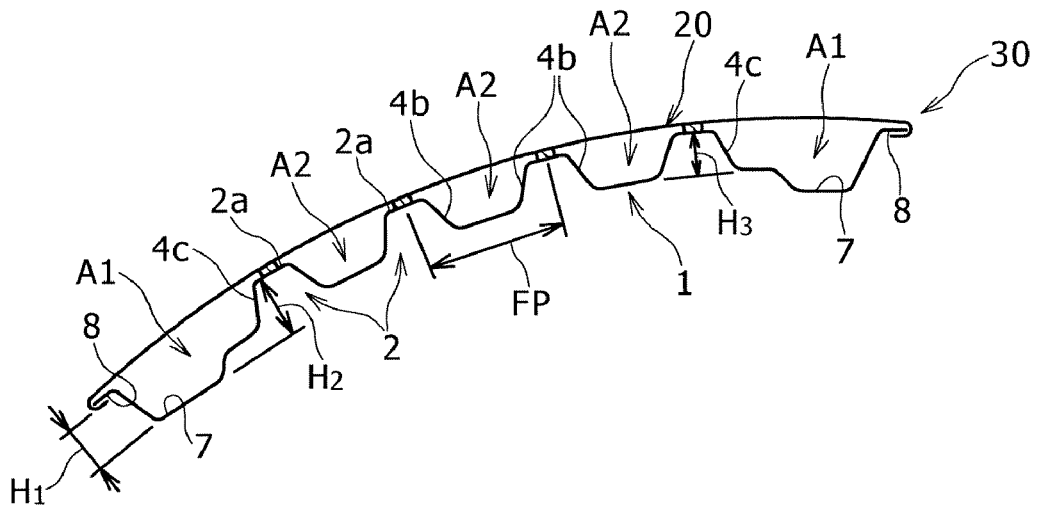
FIG. 2A is a typical sectional view taken on the line Y-Y in FIG. 1.
Figure 2B:
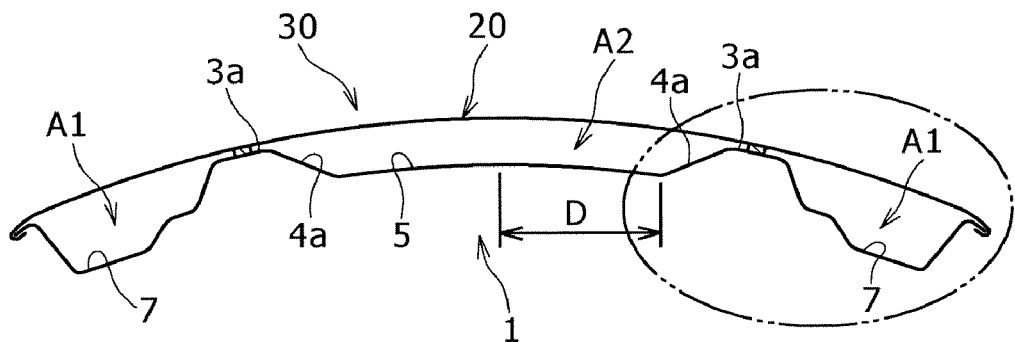
FIG. 2B is a typical sectional view taken on the line X-X in FIG. 1.
Figure 2C:
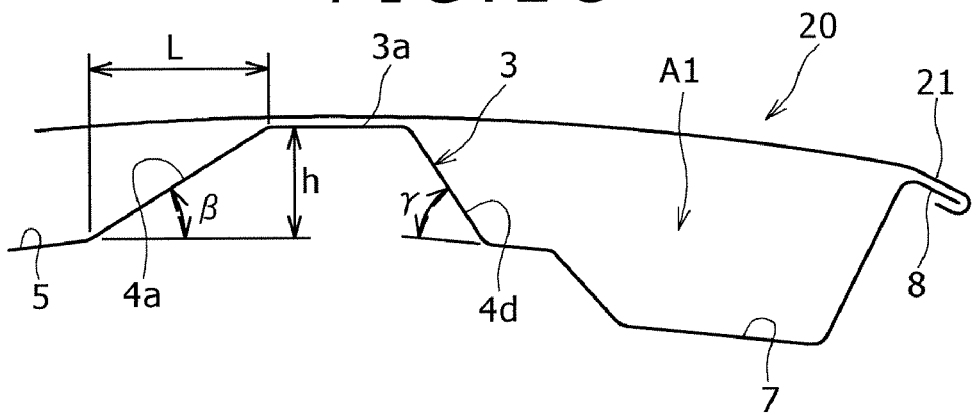
FIG. 2C is a typical, enlarged view of a part surrounded by a circle indicated by a two-dot chain line in FIG. 2B.
Figure 3:
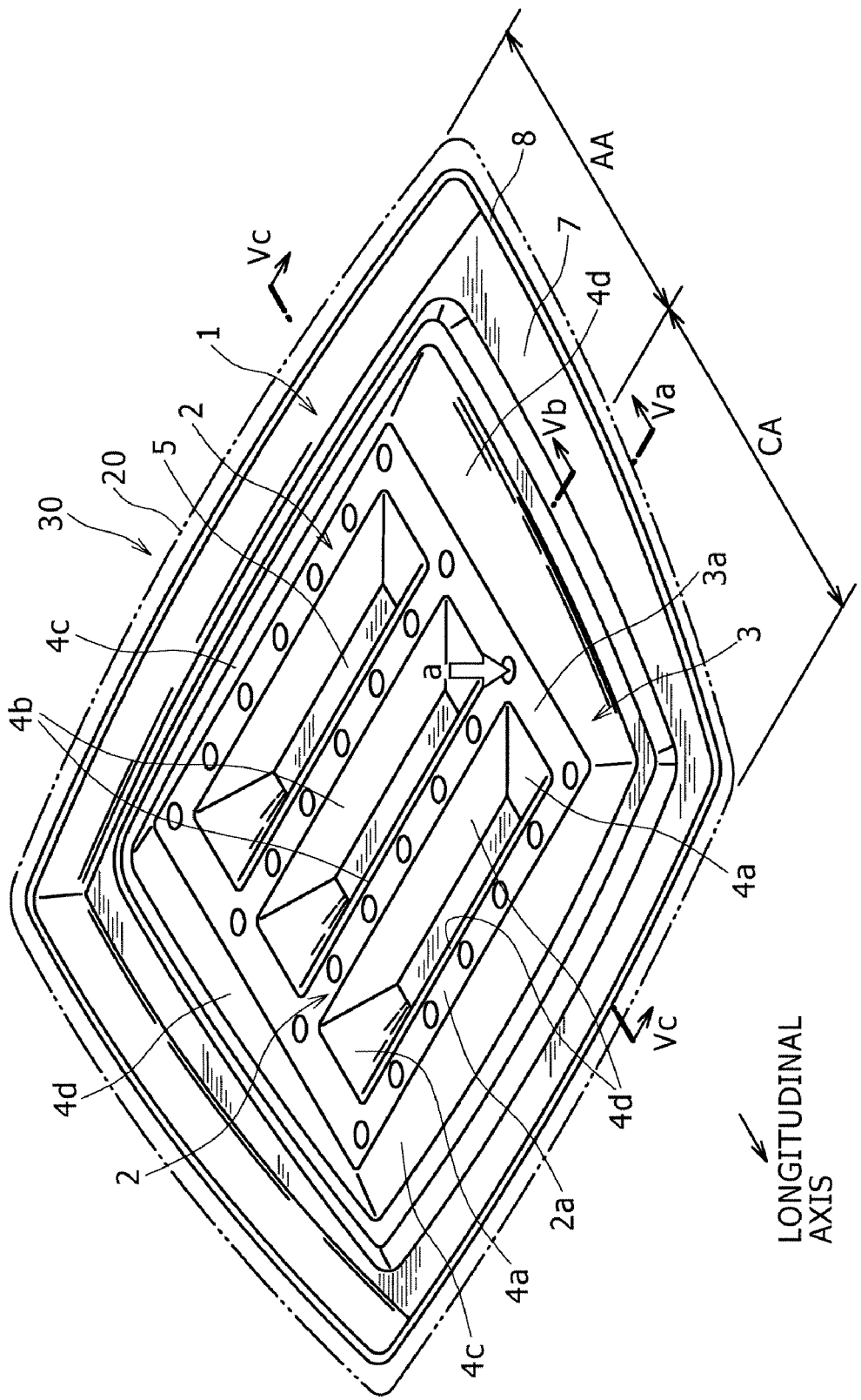
FIG. 3 is a perspective view of assistance in explaining an impact position in an inner panel included in the automotive engine hood in the first embodiment.

FIG. 1 is an exploded perspective view of an automotive engine hood in a first embodiment according to the present invention, FIG. 2A is a typical sectional view taken on the line Y-Y in FIG. 1, FIG. 2B is a typical sectional view taken on the line X-X in FIG. 1, FIG. 2C is a typical, enlarged view of a part surrounded by a circle indicated by a two-dot chain line in FIG. 2B, and FIG. 3 is a perspective view of assistance in explaining an impact position in an inner panel included in the automotive engine hood in the first embodiment.

First Embodiment

Referring to FIG. 1, an automotive engine hood 30 is a first embodiment according to the present invention is formed by joining together an outer panel 20 and an inner panel 1. Spaces A1 and A2 are formed between the outer panel 20 and the inner panel 1 as shown in FIG. 2A.

Outer Panel

As shown in FIG. 1, the outer panel 20 is formed by bending a lightweight, high-tension metal sheet in a plane or a desired curved shape. Preferably, the material of the metal sheet is a steel or an aluminum alloy of the 3000 system, the 5000 system, the 6000 system or the 7000 system. A preferable thickness of the outer panel 20 is, for example, 1.1 mm or below when the outer panel 20 is formed by processing a steel sheet or 1.5 mm or below when the outer panel 20 is formed by processing an aluminum alloy sheet. The outer panel 20 may be a resin panel or a carbon fiber reinforced resin panel. Respective edge parts of the outer panel 20 and the inner panel 1 by hemming work, bonding or brazing. The spaces A1 and A2 are formed between the outer panel 20 and the inner panel 1.

Inner Panel

Referring to FIGS. 1 to 3, the inner panel 1 is provided in its central part with a plurality of transverse beads 2 and connecting beads 3. A peripheral part of the inner panel 1 is bent to form an upward concave framing part 7 surrounding the central part of the inner panel 1 and having an inner panel edge part 8. The inner panel I is formed by processing a light weight, high-tension metal sheet. Preferably, the material of the metal sheet is a steel or an aluminum alloy of the 3000 system, the 5000 system, the 6000 system or the 7000 system.

The thickness T of the inner panel 1 is selectively determined taking into consideration a bending rigidity dependent on the type of a vehicle to which the automotive engine hood 30 is applied. The thickness T is in the range of 0.7 to 1.5 mm when the inner panel 1 is formed by processing an aluminum alloy sheet or in the range of 0.5 to 1.1 mm when the inner panel 1 is formed by processing a steel sheet. The bending rigidity of the automotive engine hood 30 is insufficient if the thickness T is below the lower limit of the suitable thickness range. The pedestrian-protective performance of the automotive engine hood 30 is unsatisfactory if the thickness T is greater than the upper limit of the suitable thickness range because the crushing load is excessively large when the thickness T is greater than the upper limit of the suitable thickness range. The automotive engine hood 30 does not need to be provided with a sufficiently high bending rigidity only by the inner panel 1 and may be provided with a sufficiently high bending rigidity by the inner panel 1 and reinforcing members, not shown, incorporated into the inner panel 1.

Referring to FIGS. 2A, 2B and 3, the transverse beads 2 (four transverse beads 2 in this embodiment) extend in a direction perpendicular to the longitudinal axis of the vehicle. Opposite ends, with respect to length, of the transverse beads 2 are connected to the ridge-like connecting beads 3. The transverse beads 2 rise up toward the inner surface of the outer panel 20. The top walls of the transverse beads 2 have joint surfaces 2a bonded to the inner surface of the outer panel 20.

The ridge-like connecting beads 3 extend substantially perpendicularly to the transverse beads 2 and are connected to the opposite ends of the transverse beads 2. The top walls of the connecting beads 3 have connecting surfaces 3a flush with the joint surfaces 2a of the transverse beads 2.

The transverse beads 2 and the connecting beads 3 may be ridges having a cross section resembling a circular arc and rising toward the inner surface of the outer panel 20.

The transverse beads 2 and the connecting beads 3 have the joint surface 2a, the connecting surfaces 3a, first inclined surfaces 4a extending obliquely down from connecting surfaces 3a toward the bottom surfaces 5 of recesses surrounded by the joint surfaces 2a and the connecting surfaces 3a, respectively, second inclined surfaces 4b extending obliquely down from the joint surfaces 2a to the bottom surfaces 5 and continuous with the first inclined surfaces 4a, respectively, third inclined surfaces 4c extending from the side edges of the joint surfaces 2a to the framing part 7, and fourth inclined surfaces 4d extending obliquely down from the connecting surfaces 3a and continuous with the third inclined surfaces 4c, respectively.

The joint surfaces 2a of the transverse beads 2 and the connecting surfaces 3a of the connecting beads 3 have the same height and the same width. Parts of each of the joint surfaces 2a marked with circles and arranged at predetermined pitches MP (FIG. 12) are bonded to the outer panel 20. Parts of the connecting surfaces 3a of the connecting beads 3 also may be bonded to the outer panel 20.

Referring to FIG. 2C, the first inclined surface 4a is inclined at an inclination β, so that a distance L between the boundary between the connecting surface 3a and the first inclined surface 4a and the boundary between the first inclined surface 4a and the bottom surface 5 in a plane substantially parallel to the bottom surface 5 and the height h of the connecting surface 3a from the bottom surface 5 satisfy an inequality: 1.5 h<L. Referring to FIG. 2B, a distance D between a middle part of the bottom surface 5 and one of the opposite ends, with respect to length, of the bottom surface 5 satisfies an inequality: L<D; that is, the distance L is necessarily shorter than the distance D. The first inclined surfaces 4a have influence on the pedestrian-protective performance of the automotive engine hood 30. Each of the first inclined surfaces 4a can be gently inclined at the small inclination β without shifting the bonding parts of the connecting surfaces 3a toward the middle part of the panel. When the pedestrian's head impacts on a part of the outer panel 20 corresponding to the edge part of the inner panel 1, secondary impact acceleration can be reduced to provide a small HIC.

If 1.5 h≧L, the inclination β of the first inclined surface 4a is large, the crushing load large, the effective stroke at the impact of the head on the automotive engine hood 30 is small, and the opposite end parts of the transverse beads 2 of the inner panel 1 are difficult to crush. If the lower edge of the first inclined surface 4a is at a distance not shorter than the distance D from the middle part of the bottom surface 5, the inclination β is excessively small, the bending rigidity of a central part is low, and hence primary impact energy cannot be satisfactorily absorbed.

The fourth inclined surfaces 4d extend continuously in a range in which the transverse beads 2 are arranged. The fourth inclined surfaces 4d are inclined at an inclination γ in a predetermined range.

The second inclined surfaces 4b and the third inclined surfaces 4c are inclined at inclinations in predetermined ranges, respectively. The second inclined surfaces 4b, the third inclined surfaces 4c and the fourth inclined surfaces 4d are dependent on the height or the pitches FP (FIG. 2) of the transverse beads 2.

Preferably, the height H3 of the transverse beads 2 and the connecting beads 3 is in the range of 3 to 30 mm when the inner panel 1 is formed by processing an aluminum alloy sheet or a steel sheet. Preferably, the pitch FP is in the range of 30 to 200 mm. If the height H3 is smaller than the lower limit of the preferable range and the pitch FP is greater than the upper limit of the preferable range, the bending rigidity of the transverse beads 2 is insufficient and the tensile rigidity of the central part of the inner panel 1 is insufficient even if the thickness T is equal to the upper limit of the preferable range. The rigidity increasing effect of the transverse beads 2 and the connecting beads 3 is insufficient if the height H3 is smaller than the lower limit of the preferable range, even if the thickness T is equal to the upper limit. If the height H3 of the transverse beads 2 and the connecting beads 3 is lower than the lower limit of the preferable range, only a small part of the automotive engine hood 30 around a position at which the head impacted on the automotive engine hood 30 is deformed and stress induced in that part does not propagate. Therefore, the inertial force of the masses of the inner panel 1 and the outer panel 20 does not work effectively, energy of the primary impact cannot be satisfactorily absorbed and HIC increases. Although dependent on the height of the space underlying the automotive engine hood 30, it is possible that the inner panel 1 comes into collision with the vehicle components including the engine installed in the engine room at an early stage after the impact of the head on the automotive engine hood 30, the secondary impact acceleration increases and the HIC increases if the height H3 of the transverse beads 2 and the connecting beads 3 is higher than the upper limit of the preferable range.

The increase of HIC can be avoided by adjusting crushing load by properly determining the inclinations of the respective inclined surfaces of the transverse beads 2 and the connecting beads 3 when both the thickness T of the inner panel 1 and the height H3 of the transverse beads 2 and the connecting beads 3 are nearly equal to their upper limits. However, under such a condition, the intervals between the joints (bonded parts) of the outer panel 20 and the inner panel 1 increase and it is difficult to provide the outer panel 20 with a sufficient tensile rigidity. The rigidity of the inner panel 1 is insufficient when both the thickness T of the inner panel 1 and the height H3 of the transverse beads 2 and the connecting beads 3 are nearly equal to their lower limits. Thus it is preferable that the thickness T of the inner panel 1 and the height H3 of the transverse beads 2 and the connecting beads 3 are equal to middle points of their preferable ranges. It is preferable that the thickness T (the height H3) is nearly equal to its upper limit when the height H3 (the thickness T) is far from its upper limit.

Referring to FIGS. 1, 2A and 2B, the shape of the concave framing part 7 of the inner panel 1 has influence on the rigidity of the edge of the automotive engine hood 30 and the pedestrian-protective performance of the automotive engine hood 30. Preferably, proper values of the inside height H1 and the outside height H2 of the concave framing part 7 meet inequalities: 5 mm<H1<60 mm, 10 mm<H2<80 mm, and 20 mm<H1+H2<120 mm, respectively. The bending rigidity of the automotive engine hood 30 is insufficient when H1 and H2 are not greater than their lower limits. It is possible that the inner panel 1 comes into collision with the vehicle components including the engine installed in the engine room at an early stage after the impact of the head on the automotive engine hood 30 when H1 and H2 are not smaller than their upper limits, and, consequently, secondary impact acceleration and HIC increases, and the pedestrian-protective performance of the automotive engine hood 30 is reduced.

Referring to FIGS. 1, 2A and 2B, the inner panel edge part 8 and an outer panel edge part 21 of the outer panel 20 are joined together to form an edge part of the concave framing part 7. Although it is preferable to join the inner panel edge part 8 and the outer panel edge part 21 together by mechanical work, such as hemming work, the inner panel edge part 8 and the outer panel edge part 21 maybe joined together by welding or bonding.

The bottom surfaces 5 are formed in curved surfaces conforming to the curved shape of the outer panel 20. Each of the bottom surfaces 5 is surrounded by the first inclined surfaces 4a and the second inclined surfaces 4b. Trim openings 6 may be formed in the bottom surfaces 5 at predetermined intervals with respect to the length of the bottom surfaces 5 as shown in FIG. 1 to adjust the rigidity of the automotive engine hood 30. The trim openings 6 are formed in a part needed to have a low rigidity. The trim openings 6 may be formed in all the bottom surfaces 5 or in every other bottom surface 5.

Pedestrian-protective Performance

Figure 4A:
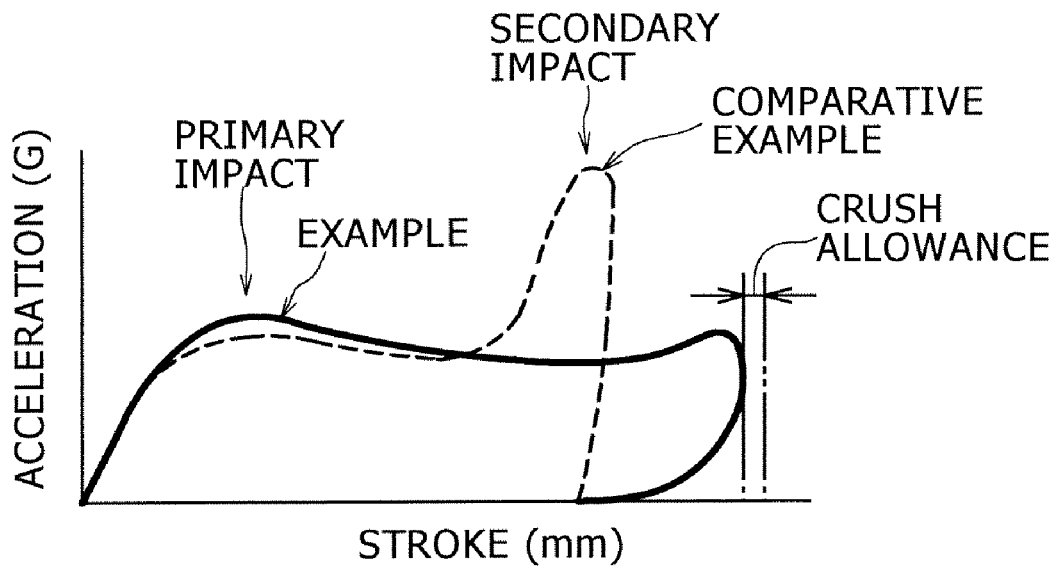
FIG. 4A is a graph showing the relation between acceleration and stroke at the impact of the head on the automotive engine hood according to the present invention.
Figure 4B:
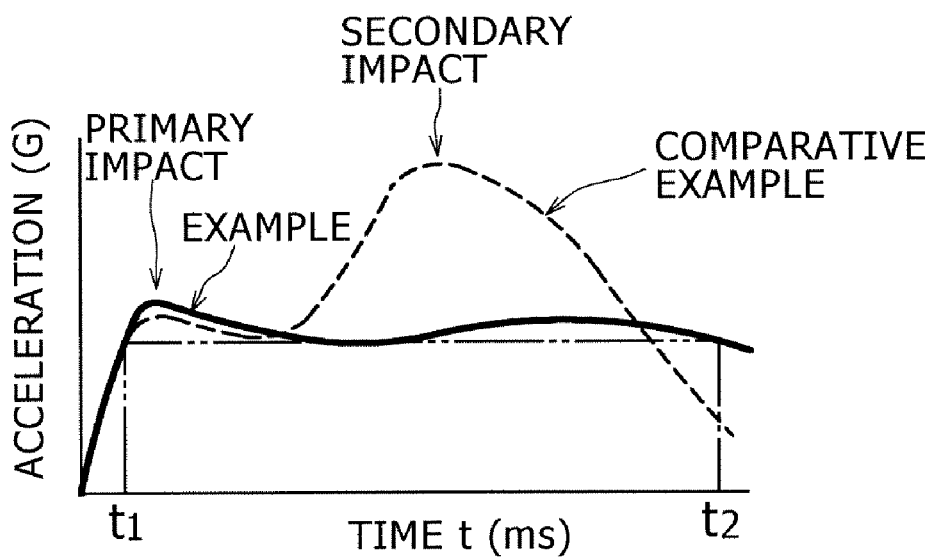
FIG. 4B is a graph showing the relation between acceleration and time at the impact of the head on the automotive engine hood according to the present invention.
Figure 5A:
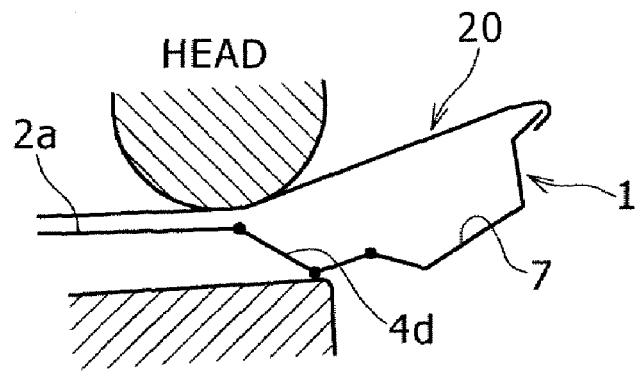
FIGS. 5A, 5B and 5C are typical views of a part a in FIG. 3 at the impact of the head taken in directions $V_a$, $V_b$ and $V_c$, respectively.
Figure 5B:
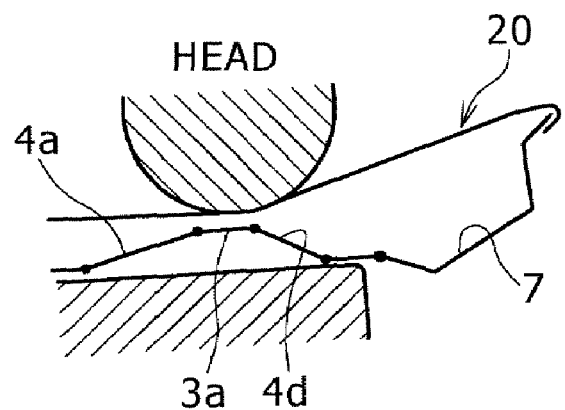
Figure 5C:
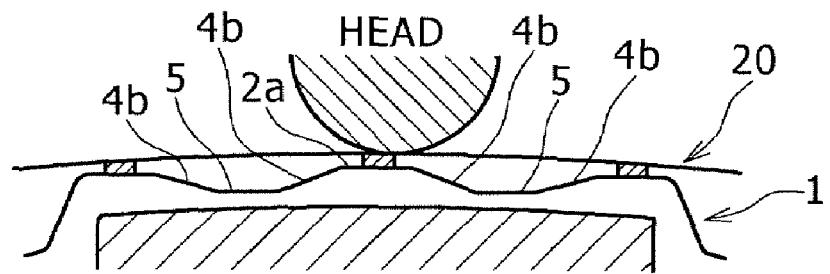

FIG. 4A is a graph showing the relation between acceleration and stroke at the impact of the head on a part a of the automotive engine hood 30 shown in FIG. 3, FIG. 4B is a graph showing the relation between acceleration and time at the impact of the head on the part a of the automotive engine hood 30, and FIGS. 5A, 5B and 5C are typical views of the part a in FIG. 3 at the impact of the head on the automotive engine hood 30 taken in directions $V_a$, $V_b$ and $V_c$, respectively.

When the head impacts on a part a shown in FIG. 3 of the automotive engine hood 30 having the foregoing section, acceleration varies along a continuous line shown in FIG. 4A. As shown in FIG. 4A, in the automotive engine hood 30, as compared with the known automotive engine hood, primary impact acceleration is high and the absorbed amount of energy of the primary impact is large. The automotive engine hood 30 is deformed greatly, crush allowance is small and stroke is large. Consequently, secondary impact acceleration is low. Since the acceleration thus changes such that the average acceleration in a predetermined time is low, the value of HIC, namely, an index of pedestrian-protective performance, calculated by using Expression (1) is small. In FIGS. 4A and 4B, curves indicated by dotted lines are curves shown in FIGS. 15A and 15B, respectively.

As obvious from the curves shown in FIGS. 4A and 4B, the pedestrian-protective performance of the automotive engine hood 30 is higher than that of the known automotive engine hood. As shown in FIG. 4B showing the variation of acceleration with time, secondary impact acceleration is low. Thus the automotive engine hood 30, as compared with the known automotive engine hood, reduces secondary impact acceleration and HIC effectively.

Rigidity

As shown in FIGS. 2A and 2B, the inclination β of the first inclined surfaces 4a of the automotive engine hood 30 is determined taking into consideration the relation expressed by 1.5 h<L and the distance D. Therefore, the automotive engine hood 30 can be easily deformed as shown in FIGS. 5A to 5C when the pedestrian's head impacts on the automotive engine hood 30. The spaces A1 are formed between the outer panel 20 and the inner panel 1 and hence the automotive engine hood 30 has a two-dimensional cross section. Therefore, the automotive engine hood 30 has required bending and torsional rigidities. Since the joint surfaces 2a of the transverse beads 2 of the inner panel 1 are not shifted toward the central part of the inner panel 1, the automotive engine hood 30 has sufficient tensile rigidity and satisfactory dent resistance.

Figure 6:
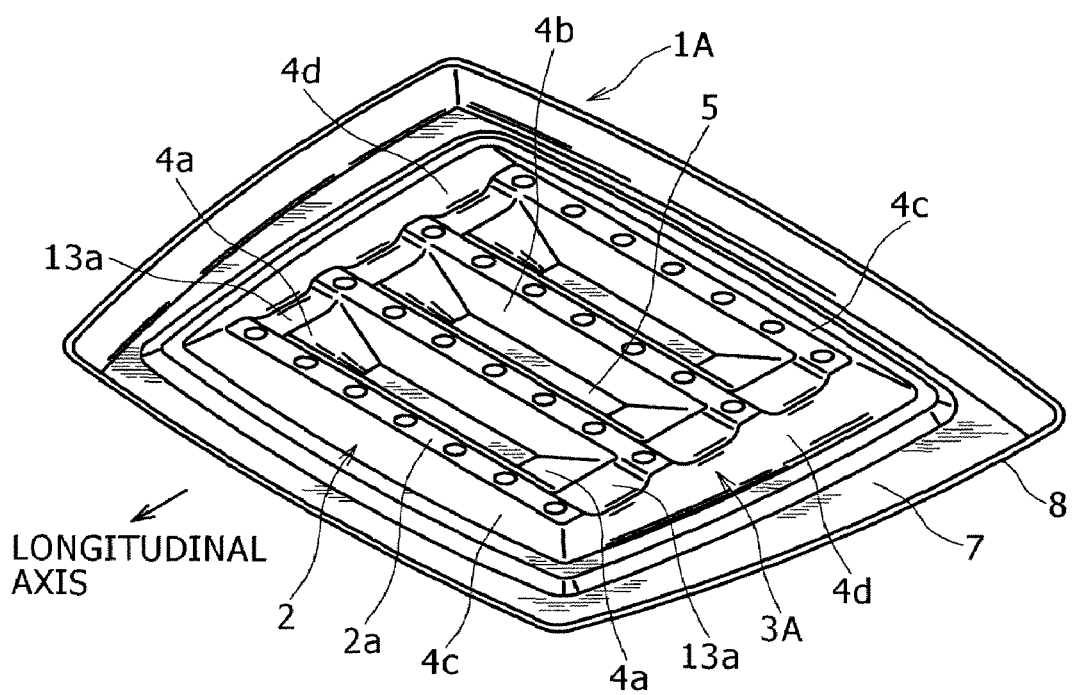
FIG. 6 is a perspective view of an inner panel included in an automotive engine hood in a modification of the first embodiment.

An inner panel 1A in a modification of the inner panel 1 of the automotive engine hood 30 in the first embodiment will be described with reference to FIG. 6, in which parts like or corresponding to those of the automotive engine hood 30 will be designated by the same reference characters and the description thereof will be omitted.

Modification of Connecting Surface

The connecting surfaces 13a of the connecting beads 3A of the automotive engine hood 30 in the first embodiment in FIG. 1 are flush with the joint surfaces 2a of the transverse beads 2. The inner panel 1A shown in FIG. 6 has transverse beads 2 having joint surfaces 2a, and connecting beads 3A having connecting surfaces 13a contained in a plane below a plane containing the joint surfaces 2a. First inclined surfaces 4a are extended between the connecting surfaces 13a and bottom surfaces 5 so as to meet inequalities: 1.5 h<L and L<D, where h is the height of the connecting beads 3A. In the inner panel 1A, the joint surfaces 2a and the connecting surfaces 13a are connected by inclined surfaces. The joint surfaces 2a and the connecting surfaces 13a may be connected by gently curved surfaces. The connecting surfaces 13a of the connecting beads 3A and the joint surfaces 2a of the transverse beams 2 are formed stepwise such that the connecting surfaces 13a are lower than the joint surfaces 2a. Therefore, an automotive engine hood provided with the inner panel 1A has a rigidity lower than that of the automotive engine hood 30 shown in FIG. 1. The automotive engine hood provided with the inner panel 1A, as compared with the known automotive engine hood, can effectively suppress secondary impact acceleration, can effectively absorb energy of primary impact, can reduce secondary impact acceleration and has a small HIC.

As apparent from the foregoing description, in the automotive engine hood 30, the opposite ends of the transverse beads 2 are connected by the connecting beads 3, the connecting surfaces 3a, 13a are flush with the joint surfaces 2a or are contained in a plane below a plane containing the joint surfaces 2a, and the inclined surfaces 4a extending obliquely down from the connecting surfaces 3a and 13a are inclined at the inclination β. Therefore, the peripheral part surrounding the transverse beads 2 and the connecting beads 3 has an HIC substantially equal to that of a central part of the inner panel. Thus the automotive engine hood 30 can exercise satisfactory pedestrian-protective performance.

Second Embodiment

Figure 7A:
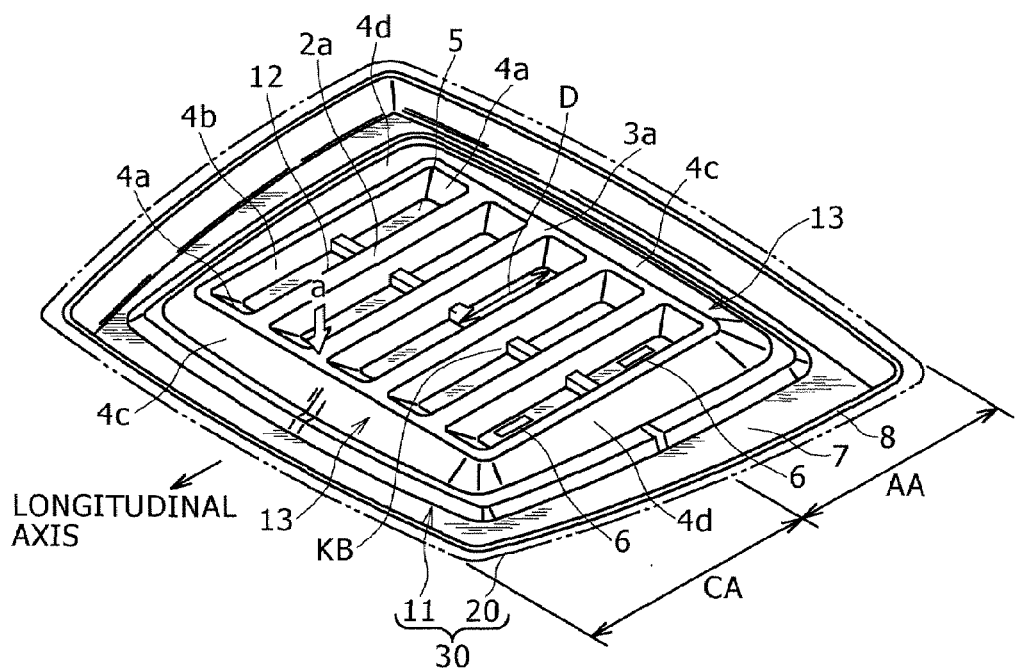
FIGS. 7A and 7B are a perspective view and a typical sectional view, respectively, of an automotive engine hood in a second embodiment according to the present invention.
Figure 7B:
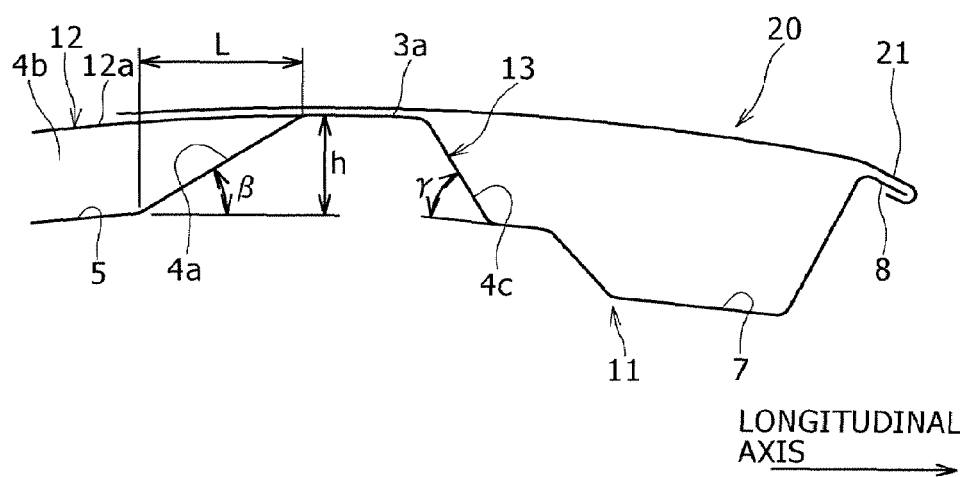
Figure 8A:
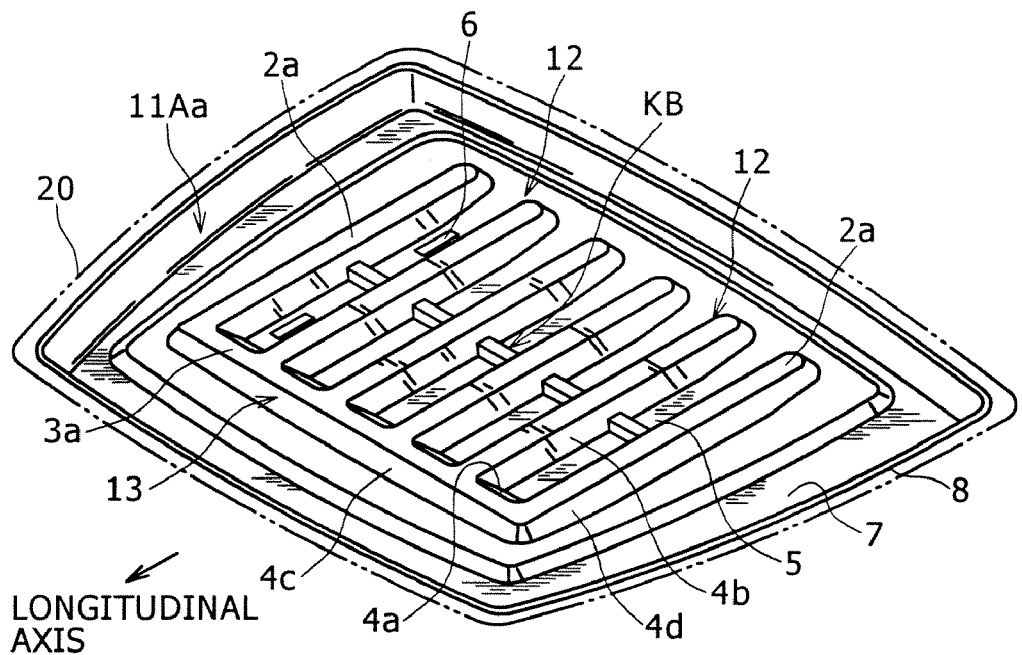
FIGS. 8A and 8B are perspective views of examples of connecting beads for the inner panel of the automotive engine hood shown in FIG. 7A.
Figure 8B:
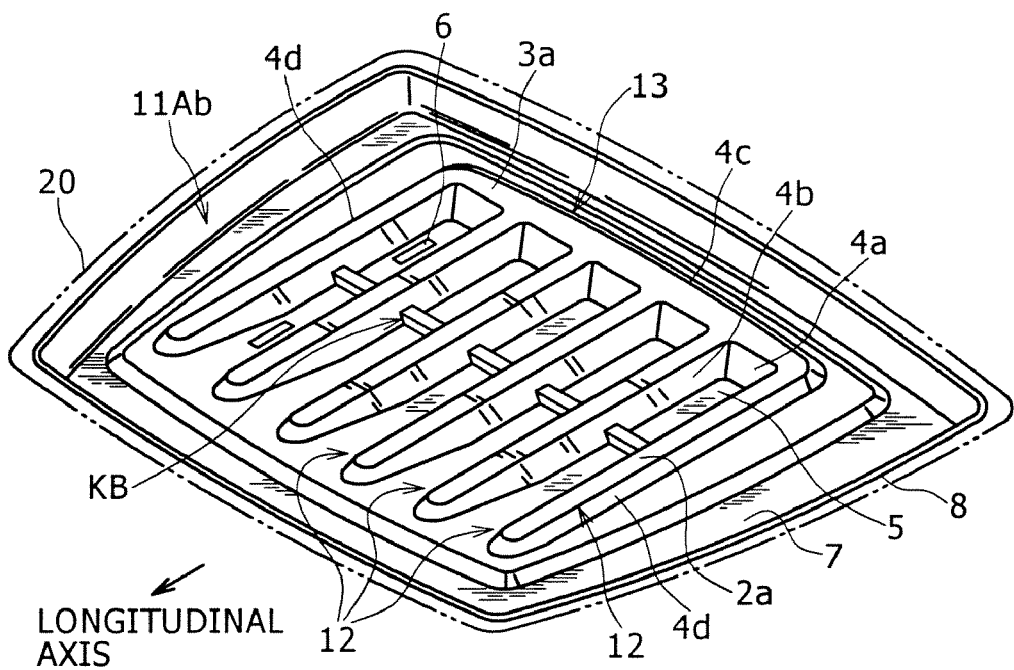

An automotive engine hood 30 in the second embodiment according to the present invention will be described. FIGS. 7A and 7B are a perspective view and a typical sectional view, respectively, of an inner panel 11 included in the automotive engine hood 30 in the second embodiment, and FIGS. 8A and 8B are perspective views of examples of connecting beads for the inner panel 11 shown in FIG. 7A.

The inner panel 11 of the automotive engine hood 30 in the second embodiment shown in FIG. 7A is provided with longitudinal beads 12 extending substantially parallel to the longitudinal axis of the vehicle. The longitudinal beads 12 are substantially the same as the transverse beads 2 and are different only in the direction in which the longitudinal beads 12 are extended. In FIGS. 7A, 7B, 8a and 8B, parts like or corresponding to those shown in FIGS. 1 to 6 are designated by the same reference characters and the description thereof will be omitted.

Referring to FIGS. 7A and 7B, the inner panel 11 is provided with the six longitudinal beads 12 extending substantially parallel to the longitudinal axis of the vehicle. The respective longitudinally opposite ends of the longitudinal beads 12 are connected by ridge-like connecting beads 13. The longitudinal beads 12 protrude up toward the inner surface of an outer panel 20. The longitudinal beads 12 have top walls respectively having joint surfaces 2a bonded to the inner surface of the outer panel 20. The longitudinal beads 12 are not necessarily exactly parallel to the longitudinal axis of the vehicle and may be substantially parallel to the longitudinal axis.

The connecting beads 13 are continuously extended substantially perpendicularly to the longitudinal beads 12 and connect the longitudinal opposite ends of the longitudinal beads 12, respectively. The connecting beads 13 have top walls having connecting surfaces 3a flush with the joint surfaces 2a of the longitudinal beads 12.

The longitudinal beads 12 and the connecting beads 13 may be ridges having a cross section resembling a circular arc and rising toward the inner surface of the outer panel 20.

The longitudinal beads 12 and the connecting beads 13 have the joint surface 2a, the connecting surfaces 3a, first inclined surfaces 4a extending obliquely down from the connecting surfaces 3a toward the bottom surfaces 5 of recesses surrounded by the joint surfaces 2a and the connecting surfaces 3a, respectively, second inclined surfaces 4b extending obliquely down from the joint surfaces 2a to the bottom surfaces 5 and continuous with the first inclined surfaces 4a, respectively, third inclined surfaces 4c extending from the side edges of the connecting surfaces 3a to a framing part 7, and fourth inclined surfaces 4d extending obliquely down from the joint surfaces 2a and continuous with the third inclined surfaces 4c, respectively.

The inner panel 11 and the outer panel 20 are joined together to form the automotive engine hood 30. As mentioned above in connection with FIGS. 4 and 5, the first inclined surfaces 4a are inclined at an inclination β. A part of the outer panel 20 corresponding to an edge part of the inner panel 1 surrounding the longitudinal beads 12 and the connecting beads 13 have a HIC substantially equal to that of a central part of the automotive engine hood 30. Thus the automotive engine hood 30 exercises satisfactory pedestrian-protective performance when the pedestrian's head impacts on the part of the outer panel 20 corresponding to an edge part of the inner panel 1 surrounding the longitudinal beads 12 and the connecting beads 13. The automotive engine hoods 30 in the first and the second embodiment are substantially the same in functional properties. Therefore, graphs shown in FIGS. 4A and 4B and illustrations in FIGS. 5A to 5C apply also to the second embodiment. The inner panel 11 may be provided with crush beads KB indicated by imaginary lines in FIG. 7A and arranged perpendicularly to the longitudinal axis of the vehicle in a middle part of the inner panel 11 with respect to the longitudinal direction.

The inner panel 11 may be provided with only a single connecting bead 13 connecting the front ends of the longitudinal beads 12 or only single connecting beads 13 connecting the rear ends of the longitudinal beads 12 depending on the type of the vehicle. An inner panel 11Aa provided with a connecting bead 13 connecting the front ends of the longitudinal beads 12 and an inner panel 11Ab provided with a connecting bead 13 connecting the rear ends of the longitudinal beads 12 are shown in FIGS. 8A and 8B, respectively. The connecting bead 13 affects the absorption of energy of the primary and the secondary impact. Therefore, it is desirable to use the connecting bead 13 selectively for forming a child impact part CA and an adult impact part AA as shown in FIG. 7A. It is desirable that the inner panels 11Aa and 11Ab are provided with a connecting bead 13 such that parts of the inner panels 11Aa and 11Ab in the child impact part CA on which a child's head having a comparatively small mass is likely to impact are easily crushable by a small crushing load. On the other hand, it is desirable that parts of the inner panels 11Aa and 11Ab in the adult impact part AA on which an adult's head having a comparatively large mass is likely to impact are not provided with any connecting bead such that those parts are crushed easily to absorb energy. Since a proper crushing load is dependent on the dimensions of the space extending under the automotive engine hood, the connecting beads 13 is used selectively and the height of the connecting beads 13 and the inclinations of the inclined surfaces are selectively determined. Parts shown in FIGS. 8A and 8B like or corresponding to those previously described are designated by the same reference characters and the description thereof will be omitted. The inner panels 11, 11Aa and 11Ab may be provided with crush beads KB indicated by imaginary lines and arranged perpendicularly to the longitudinal axis of the vehicle in respective middle parts of the inner panels 11, 11Aa and 11Ab with respect to the longitudinal direction.

Modification of Connecting Surface

Figure 9A:
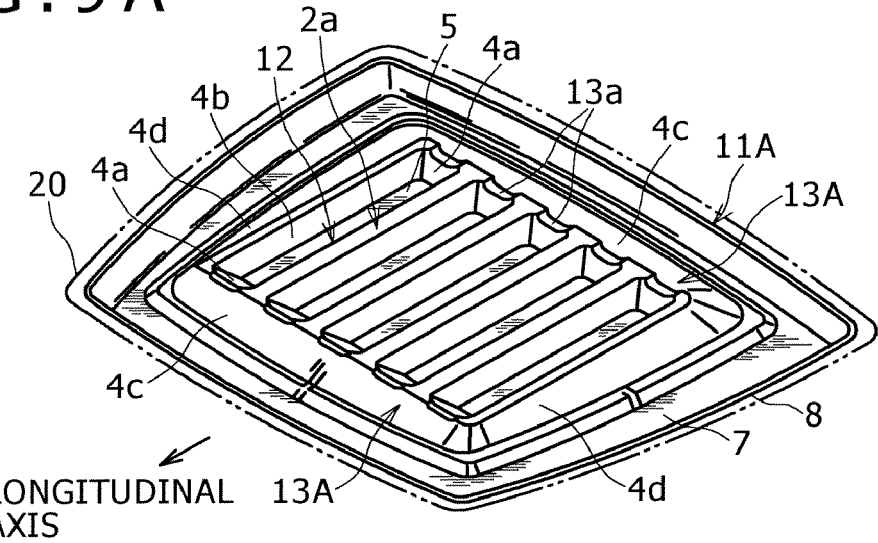
FIGS. 9A, 9B and 9C are perspective views of connecting surfaces in modifications of those of the inner panels shown in FIG. 7A, 8A and 8B.
Figure 9B:
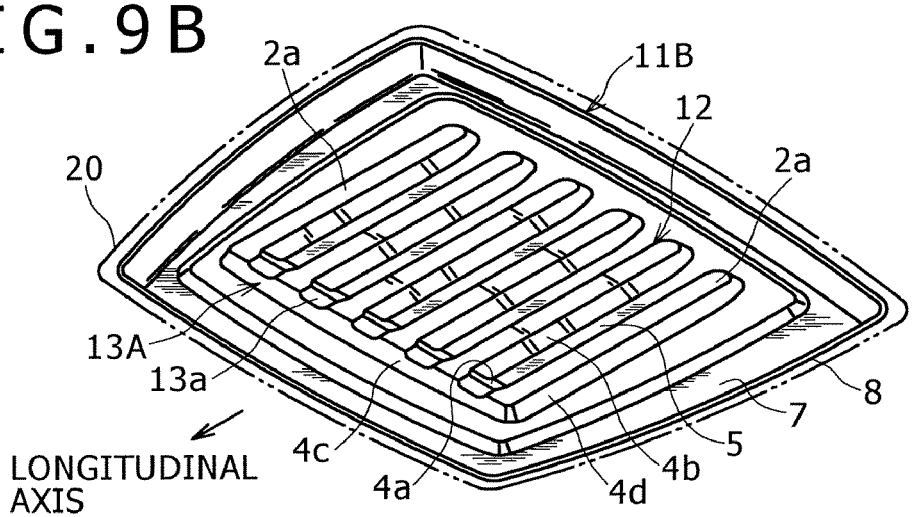
Figure 9C:
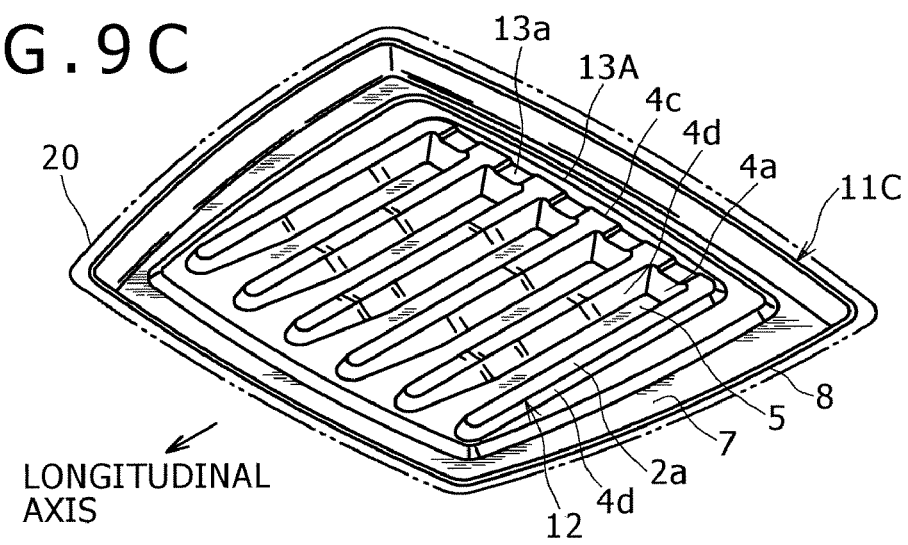

FIGS. 9A, 9B and 9C show inner panels 11A, 11B and 11C in modifications, respectively. The connecting surfaces 13a of connecting beads 13A of the automotive engine hood 30 in the second embodiment shown in FIGS. 7 and 8 are flush with the joint surfaces 2a of the transverse beads 12. The inner panels 11A, 11B and 11C shown in FIGS. 9A, 9B and 9C have longitudinal beads 12 having joint surfaces 12a, and the connecting beads 13A having connecting surfaces 13a contained in a plane below a plane containing the joint surfaces 12a. First inclined surfaces 4a are extended between the connecting surfaces 13a and bottom surfaces 5 so as to meet inequalities: 1.5 h<L and L<D, where h is the height of the connecting beads 13A. In the inner panel 11A, 11B and 11C, the joint surfaces 12a and the connecting surfaces 13a are connected by inclined surfaces. The joint surfaces 12a and the connecting surfaces 13a may be connected by gently curved surfaces, respectively. The connecting surfaces 13a of the connecting beads 13A and the joint surfaces 12a of the longitudinal beams 12 are formed stepwise such that the connecting surfaces 13a are lower than the joint surfaces 2a. Although automotive engine hoods respectively provided with the inner panels 11A, 11B and 11C have a low rigidity as compared with that of the automotive engine hoods respectively provided with the inner panels 11, 11Aa and 11Ab shown in FIGS. 7, 8A and 8B, the automotive engine hoods respectively provided with the inner panels 11A, 11B and 11C, as compared with the known automotive engine hood, can effectively suppress secondary impact acceleration, can effectively absorb energy of the primary impact of the head on the automotive engine hoods, can reduce secondary impact acceleration and have a small HIC. Preferably, the inner panel 11A, 11B and 11C, similarly to those shown in FIGS. 7 and 8, are provided with crush beads KB, not shown, arranged in middle parts thereof, respectively, with respect to the longitudinal direction.

[Automotive Engine Hoods in Modifications]

In the automotive engine hood 30 shown in FIG. 1, the transversely opposite first inclined surfaces 4a are symmetrical with respect to the longitudinal axis of the vehicle.

Figure 10A:
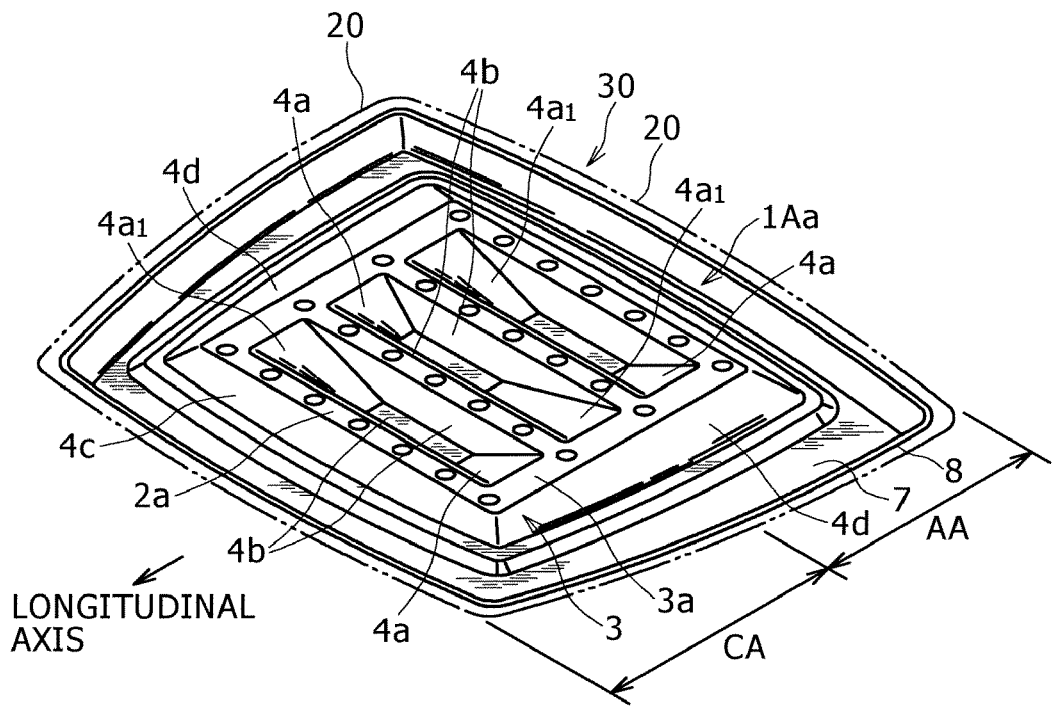
FIGS. 10A and 10B are perspective views of inner panels of automotive engine hoods according to the present invention provided with beads each having asymmetrical first inclined walls.
Figure 10B:
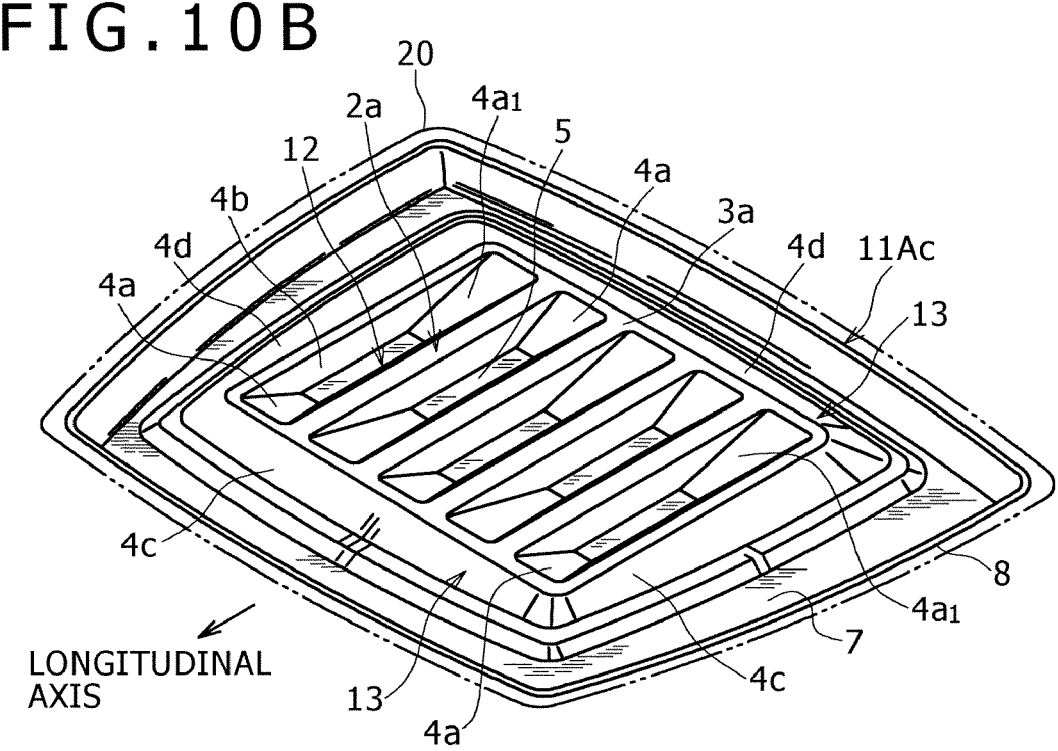

Inner panels 1Aa and 11Ac included in automotive engine hoods in modifications are shown in FIGS. 10A and 10B, in which parts like or corresponding to those shown in FIGS. 1 to 9 are designated by the same reference characters and the description thereof will be omitted. The inner panel 1Aa shown in FIG. 10A has transversely opposite first inclined surfaces 4a and 4a1 asymmetrical with respect to the longitudinal axis of the vehicle. The inner panel 11Ac shown in FIG. 10B has longitudinally opposite first inclined surfaces 4a and 4a1 asymmetrical with respect to a transverse axis perpendicular to the longitudinal axis of the vehicle.

In the inner panel 1Aa shown in FIG. 10A, the first inclined surfaces 4a and 4a1 are arranged longitudinally alternately. In the inner panel 11Ac shown in FIG. 10B, the first inclined surfaces 4a and 4a1 are arranged transversely alternately. The first inclined surface 4a is longer than the opposite first inclined surfaces 4a1. The first inclined surface 4a1 meets the inequalities: 1.5 h<L and L<D. The inner panels provided with those asymmetrical first inclined surfaces 4a and 4a1 are used according to the design of the vehicle.

Figure 11A:
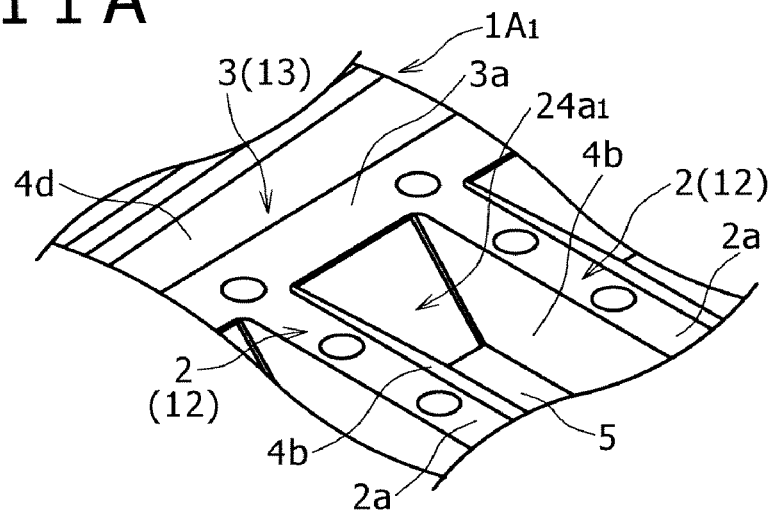
FIGS. 11A, 11B and 11C are perspective views of first inclined walls of automotive engine hoods according to the present invention respectively provided with openings.
Figure 11B:
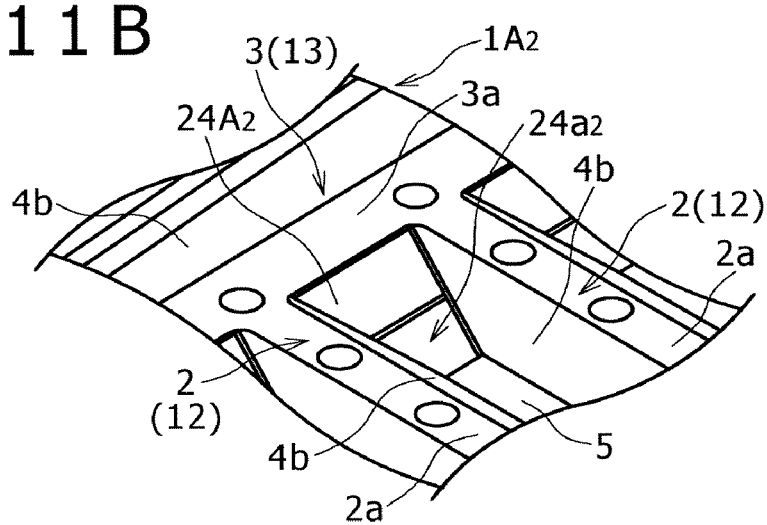
Figure 11C:
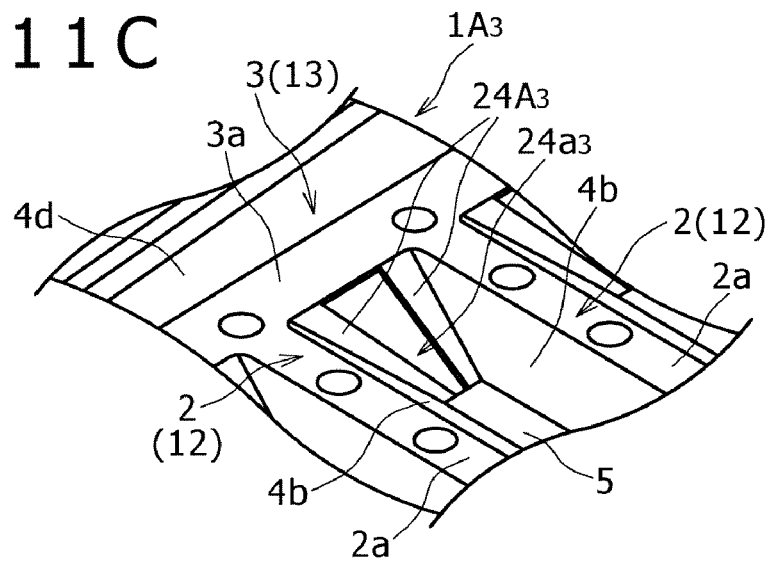

In the inner panels 1 (1A and 1Aa) and 11 (11Aa, 11Ab, 11Ac, 11A, 11B and 11C), the first inclined surfaces 4a and/or 4a1 may be provided with openings as shown in FIGS. 11A, 11B and 11C, in which parts like or corresponding to those previously described are designated by the same reference characters and the description thereof will be omitted.

Referring to FIG. 11A, an inner panel 1A1 is provided with openings 24a1 formed in parts corresponding to first inclined surfaces. The openings 24a1 may be formed by cutting off walls having first inclined surfaces or may be formed simultaneously with transverse beads 2 by press working.

Referring to FIG. 11B, an inner panel 1A2 is provided with openings 24a2 each formed in a part corresponding to a lower half of a fist inclined surface. The opening 24a2 is formed by cutting off a part of an inclined surface 24A2. The openings 24a2 are formed in a proper size.

Referring to FIG. 11C, an inner panel 1A3 is provided with openings 24a3 formed in parts on opposite sides of a first inclined surface 24A3. The openings 24a3 may be rectangular openings extending from a connecting surface 3a to a bottom surface 5 and having a uniform width or may be a trapezoidal openings having a short side on the side of the connecting surface 3a and a long side on the side of the bottom surface 5 (not shown).

Crushing load can be adjusted so that the automotive engine hoods having the inner panels 1A1, 1A2 and 1A3 are easily crushed upon the impact of the head on the automotive engine hoods by forming the openings 24a1, 24a2 and 24a3 as shown in FIGS. 11A, 11B and 11C.

The openings 24a1, 24a2 and 24a3 may be formed in parts corresponding to all the first inclined surfaces or may be formed in parts corresponding to some of the first inclined surfaces at specified positions. There are not any particular restrictions on the shape of the openings 24a1, 24a2 and 24a3. For example, each of the openings 24a1, 24a2 and 24a3 may be a plurality of through holes or a slot.

Figure 12:
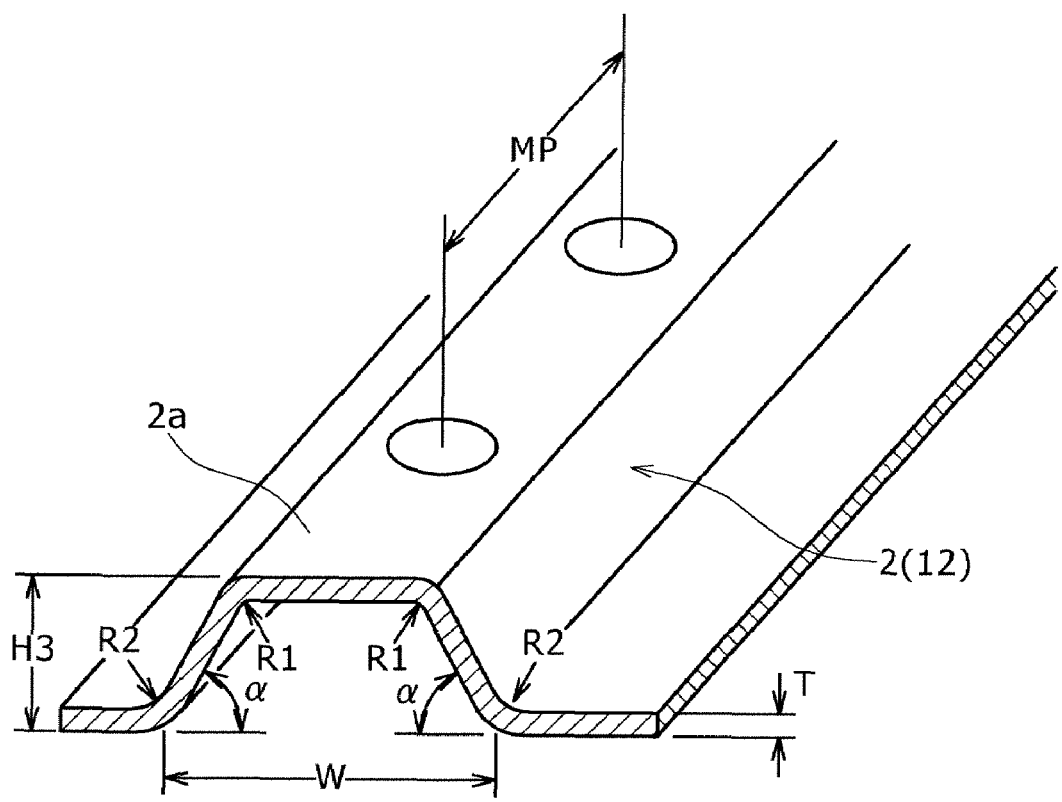
FIG. 12 is a perspective view of an example of a transverse bead, a longitudinal bead or a connecting bead for an automotive engine hood according to the present invention.
Figure 13A:
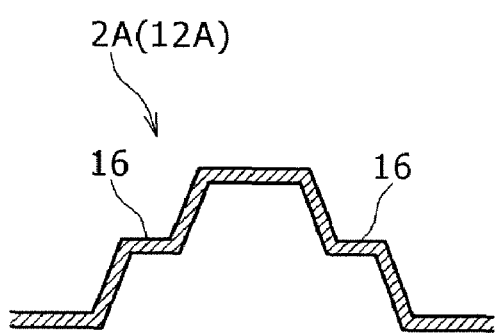
FIGS. 13A and 13B are sectional views of examples of a transverse bead, a longitudinal bead or a connecting bead for an automotive engine hood according to the present invention.
Figure 13B:
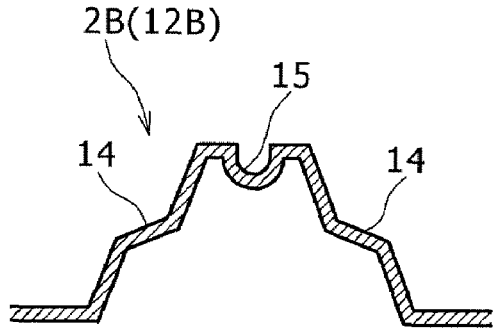
Figure 14A:
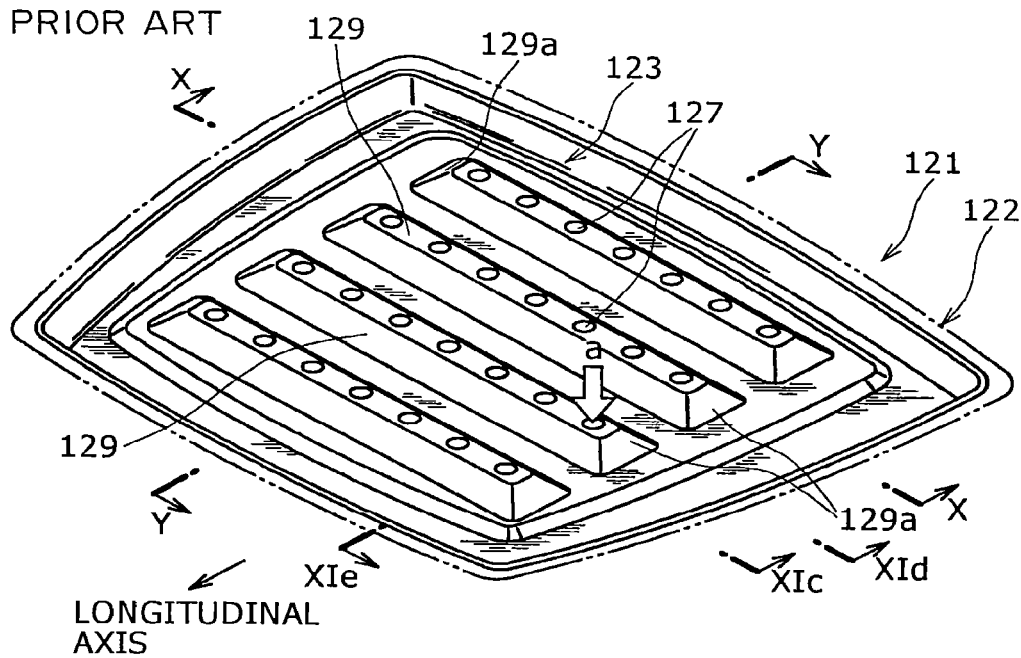
FIG. 14A is a perspective view of a known automotive engine hood.
Figure 14B:
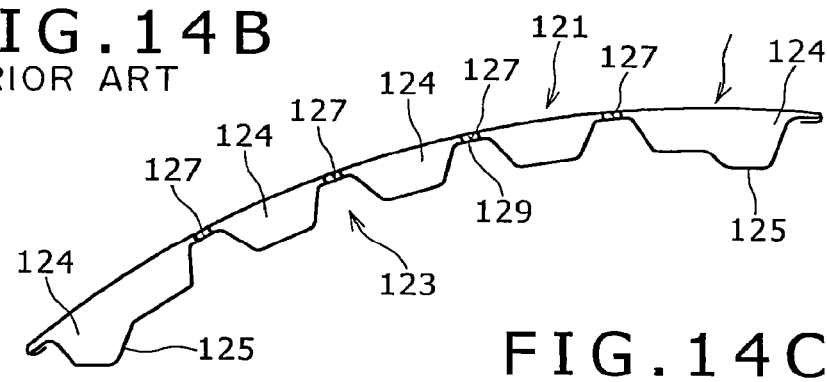
FIG. 14B is a typical sectional view taken on the line Y-Y in FIG. 14A.
Figure 14C:
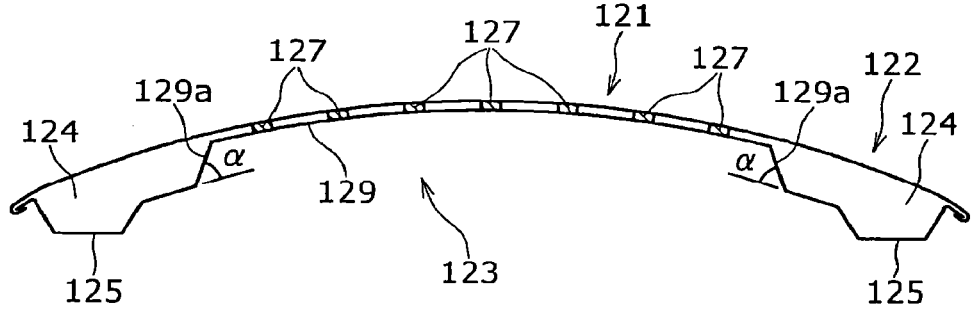
FIG. 14C is a typical sectional view taken on the line X-X in FIG. 14A.
Figure 16A:
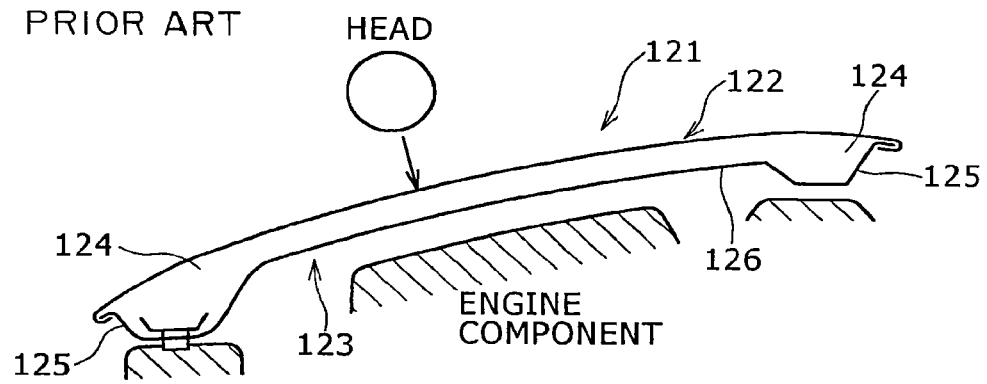
FIG. 16A is a typical view of assistance in explaining the impact of the head on a known automotive engine hood.
Figure 16B:
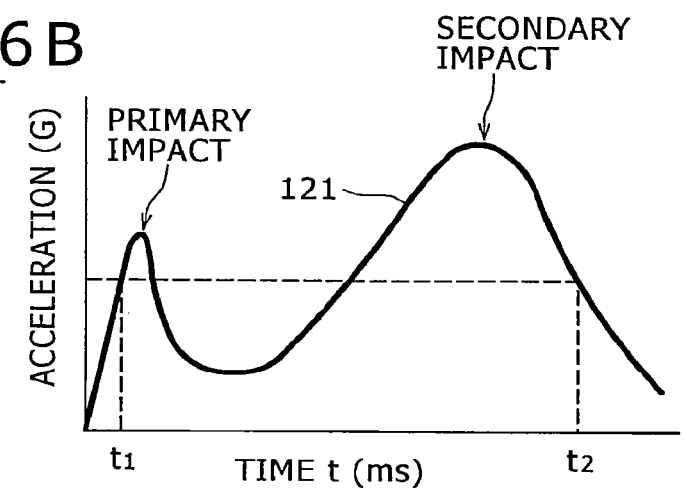
FIG. 16B is a graph showing the relation between acceleration and time at the impact of the head on a central part of an automotive engine hood shown.
Figure 16C:
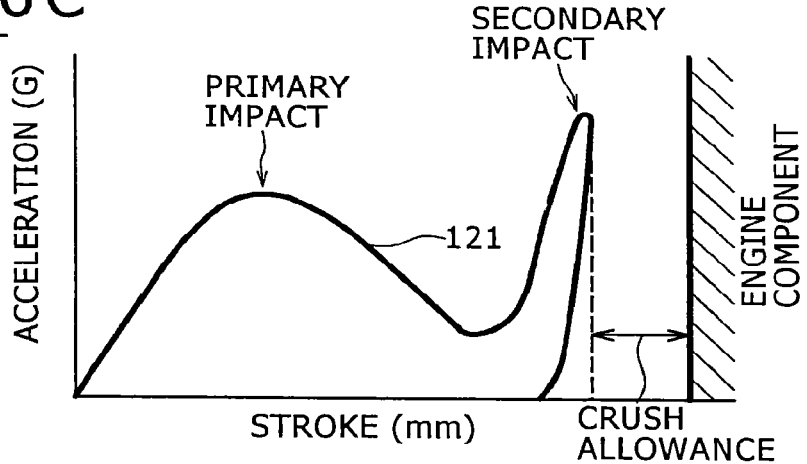
FIG. 16C is a graph showing the relation between acceleration and stroke at the impact of the head on the central part of the automotive engine hood.

Possible modifications in the automotive engine hoods according to the present invention will be described with reference to FIGS. 12, 13A and 13B. FIG. 12 is a perspective view of a transverse bead 2 (12), and FIGS. 13A and 13B are cross-sectional views of transverse beads in modifications.

A child and an adult impact on different parts of the automotive engine hood 30, respectively. A front part and a rear part of the automotive engine hood 30 are a child impact part CA and an adult impact part AA, respectively. The child impact part CA and the adult impact part AA may be different from each other in construction (FIG. 3).

For example, in each of the inner panels 1 (1A and 1Aa) and 11 (11Aa, 11Ab, 11Ac, 11A, 11B and 11C), a front part is formed in a small thickness and a rear part is formed in a big thickness. When the thickness T of the inner panel is decreased from the front end toward the rear ends, a front part of the automotive engine hood 30 can be crushed by a small crushing load at the impact of the head thereon, and a rear part of the automotive engine hood 30 can absorb the energy of primary impact satisfactorily.

In the inner panels 1 (1A and 1Aa) and 11 (11Aa, 11Ab, 11Ac, 11A, 11B and 11C), the transverse beads 2 (FIG. 3) in the child impact part CA of the automotive engine hood 30 may have a small width W and a low height H3, and those in the adult impact part AA may have a big width W and a high height H3, and front parts of the longitudinal beads 12 (FIG. 7) in the child impact part CA of the automotive engine hood 30 may have a small width W and a low height H3, and rear parts of the same in the adult impact part AA may have a big width W and a high height H3. Thus the adult impact part AA of the automotive engine hood 30 has high rigidity and is capable of satisfactory absorbing the energy of primary impact, and the child impact part CA of the same can be crushed by a small crushing load.

In the inner panel 1 (FIG. 3), radii R1 and R2 of bends in the transverse beads 2 in the child impact part CA of the automotive engine hood 30 may be big, and radii R1 and R2 of those in the adult impact part AA may be small, and, in the inner panel 12 (FIG. 7), radii R1 and R2 of bends in front parts of the longitudinal beads 12 in the child impact part CA of the automotive engine hood 30 may be big, and radii R1 and R2 of bends in rear parts of the same in the adult impact part AA may be small. Thus the adult impact part AA of the automotive engine hood 30 has high rigidity and is capable of satisfactory absorbing the energy of primary impact, and the child impact part CA of the same can be crushed by a small crushing load.

In the inner panels 1 (1A and 1Aa) and 11 (11Aa, 11Ab, 11Ac, 11A, 11B and 11C), the inclination α of the inclined end walls of the transverse beads 2 (FIG. 3) in the child impact part CA of the automotive engine hood 30 may be small, and the inclination α of those in the adult impact part AA may be large, and the inclination α of the front inclined end walls of the longitudinal beads 12 (FIG. 7) in the child impact part CA of the automotive engine hood 30 may be small and the inclination α of the rear inclined end walls of the same in the adult impact part AA may be large. When the inclined end walls are thus inclined in different, proper inclinations, the adult impact part AA of the automotive engine hood 30 has high rigidity and is capable of satisfactory absorbing the energy of primary impact, and the child impact part CA of the same can be crushed by a small crushing load.

In the inner panels 1 (1A and 1Aa) and 11 (11Aa, 11Ab, 11Ac, 11A, 11B and 11C), the joints in the joint surfaces 2a of the transverse beads 2 (FIG. 3) in a front part of the automotive engine hood 30, which is required to be satisfactory in tensile rigidity and dent resistance, may be arranged at small pitches MP, and the joints in front parts of the joint surfaces 2a of the longitudinal beads 12 (FIG. 7) in a front part of the automotive engine hood 30, which is required to be satisfactory in tensile rigidity and dent resistance, may be arranged at small pitches MP.

The automotive engine hood 30 of the present invention may be provided with an inner panel provided with transverse beads 2A or longitudinal beads 12A having second inclined surfaces each having a horizontal step 16 as shown in FIG. 13A or may be provided with an inner panel provided with transverse beads 2B or longitudinal beads 12B having second inclined surfaces each having an inclined step 14 as shown in FIG. 13B. Each of the transverse beads 2B or the longitudinal beads 12B may have a joint surface provided with a groove 15 in a predetermined part thereof as shown in FIG. 13B. The horizontal step 16 promotes the deformation of the transverse bead 2A or the longitudinal bead 12A, and the inclined step 14 or the groove 15 promotes the deformation of the transverse bead 2B or the longitudinal bead 12B at the impact of the head on the automotive engine hood 30.

The width W and the height H3 of the transverse beads 2 or the longitudinal beads 12 of the automotive engine hood 30 may be selectively determined according to the shape and design of the outer panel 20. Branches may be extended from the transverse beads 2 or the longitudinal beads 12. The inner panel 1 may be provided with a crush bead, not shown, to prevent the automotive engine hood 30 from thrusting into the passenger compartment of the vehicle. The inner panel 1 may be provided with through holes, not shown, for use in attaching a hood silencer, a washer hose and rubber cushions to the inner panel 1.

The inner panels 1 (1A and 1Aa) and 11 (11Aa, 11Ab, 11Ac, 11A, 11B and 11C) may be provided with drain holes for draining an electrodeposition paint used for the electrodeposition coating of the inner panel or water used for cleaning the automotive engine hood 30.

Although joints of the inclined surfaces and the joint surfaces, and those of the joining surfaces and the bottom surfaces of the automotive engine hoods 30 shown in FIGS. 1 to 13 are shown in edges, those joints may be curved surfaces, respectively.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. An automotive engine hood comprising:
    an outer panel; and
    an inner panel;
    wherein respective edge parts of the outer and the inner panels are joined together such that spaces are formed between the outer and the inner panels;
    the inner panel has a plurality of ridge-like beads and ridge-like connecting beads connecting at least end parts of the ridge-like beads on one of the opposite sides of the ridge-like beads with respect to length of the ridge-like beads;
    each of the ridge-like beads has a top wall having a joint surface joined to the outer panel;
    each of the connecting beads has a top wall having a connecting surface continuous with the joint surfaces of the top walls of the ridge-like beads, and a first inclined surface extending from the connecting surface to a bottom surface surrounded by the adjacent ones of the ridge-like beads and the connecting beads,
    each of the ridge-like beads has second inclined surfaces adjacent to the first inclined surfaces and extending from opposite side edges of the connecting surface to the bottom surfaces on the opposite sides thereof,
    an upward concave framing part formed in a framing part of the inner panel surrounding the ridge-like beads and the connecting bead;
    the spaces extend between the outer and the inner panel in parts corresponding to the upward concave framing part, and in parts corresponding to the bottom surfaces; and
    distance L between a boundary between the connecting surface and the first inclined surface and a boundary between the first inclined surface and the bottom surface along the surface of the inner panel, and height h of the connecting surface from the bottom surface satisfy an inequality: 1.5 h<L.

2. The automotive engine hood according to claim 1, wherein the ridge-like beads are ridge-like transverse beads perpendicular to the longitudinal axis of a vehicle, and the ridge-like connecting beads interconnect the respective opposite ends of the adjacent ones of the ridge-like transverse beads.

3. The automotive engine hood according to claim 2, wherein the connecting surfaces of the connecting beads are continuous and flush with the joint surfaces of the ridge-like beads.

4. The automotive engine hood according to claim 2, wherein the connecting surfaces of the connecting beads are continuous with the joint surfaces of the ridge-like beads and are contained in a plane extending below a plane containing the joint surfaces of the ridge-like beads.

5. The automotive engine hood according to claim 1, wherein the ridge-like beads are longitudinal beads substantially parallel to the longitudinal axis of a vehicle.

6. The automotive engine hood according to claim 5, wherein the connecting surfaces of the connecting beads are continuous and flush with the joint surfaces of the ridge-like beads.

7. The automotive engine hood according to claim 5, wherein the connecting surfaces of the connecting beads are continuous with the joint surfaces of the ridge-like beads and are contained in a plane extending below a plane containing the joint surfaces of the ridge-like beads.

8. The automotive engine hood according to claim 1, wherein the distance L satisfies inequalities: 1.5 h<L and L<D, where D is distance between one of the opposite ends of the bottom surface and a middle part of the bottom surface.

9. The automotive engine hood according to claim 1, wherein at least a part of each of the first inclined surfaces is cut to form an opening.

10. The automotive engine hood according to claim 1, wherein trim holes are formed in a bottom wall of each of the ridge-like beads at predetermined intervals along the length of the ridge-like bead.

* * * * *